(12) United States Patent
Asakimori

(10) Patent No.: US 10,165,132 B2
(45) Date of Patent: Dec. 25, 2018

(54) SERVER APPARATUS, INFORMATION PROCESSING SYSTEM, AND INFORMATION PROCESSING METHOD FOR USER AUTHENTICATION

(71) Applicant: Hiroki Asakimori, Tokyo (JP)

(72) Inventor: Hiroki Asakimori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/404,702

(22) Filed: Jan. 12, 2017

(65) Prior Publication Data

US 2017/0208191 A1    Jul. 20, 2017

(30) Foreign Application Priority Data

Jan. 15, 2016 (JP) .................... 2016-006649
Jan. 11, 2017 (JP) .................... 2017-002923

(51) Int. Cl.
*G06F 3/12* (2006.01)
*H04N 1/00* (2006.01)
(Continued)

(52) U.S. Cl.
CPC ... *H04N 1/00339* (2013.01); *G06F 17/30569* (2013.01); *H04L 41/0816* (2013.01); *H04L 63/08* (2013.01); *H04L 67/02* (2013.01); *H04N 1/0097* (2013.01); *H04N 1/00244* (2013.01); *H04N 1/00854* (2013.01); *H04N 1/00938* (2013.01); *H04N 1/00973* (2013.01);
(Continued)

(58) Field of Classification Search
None
See application file for complete search history.

(56) References Cited

U.S. PATENT DOCUMENTS

2008/0256459 A1   10/2008  Sekiya
2009/0064301 A1   3/2009   Sachdeva et al.
(Continued)

FOREIGN PATENT DOCUMENTS

JP   2008-262309   10/2008
JP   2010-537340   12/2010
JP   2011-141684   7/2011

*Primary Examiner* — Henok A Shiferaw
(74) *Attorney, Agent, or Firm* — Harness, Dickey & Pierce, P.L.C.

(57) ABSTRACT

A server apparatus includes an acquiring unit, a reporting unit, a script acquiring unit, and a requesting unit. When a user issues a request for executing information processing to an information processing apparatus, the acquiring unit acquires unique information for uniquely identifying an information storage medium corresponding to the user through a network. The unique information is read from the information storage medium by a reading device. The reporting unit refers to a storage unit that stores therein pieces of unique information and applications relating to information processing in an associated manner with each other, to detect an application associated with the acquired unique information, and reports the acquired unique information to the detected application. The script acquiring unit acquires, from the application, a script generated by the application based on the unique information. The requesting unit transmits a request for executing the acquired script to the information processing apparatus.

20 Claims, 18 Drawing Sheets

(51) Int. Cl.
*H04L 12/24* (2006.01)
*G06F 17/30* (2006.01)
*H04L 29/06* (2006.01)
*H04N 1/32* (2006.01)
*H04L 29/08* (2006.01)

(52) U.S. Cl.
CPC ..... *H04N 1/32112* (2013.01); *H04N 1/32122* (2013.01); *H04L 67/2823* (2013.01); *H04N 2201/0094* (2013.01)

(56) References Cited

U.S. PATENT DOCUMENTS

| | | | | |
|---|---|---|---|---|
| 2015/0188914 | A1* | 7/2015 | Osawa | H04L 63/083 726/5 |
| 2015/0242163 | A1* | 8/2015 | Kogure | G06F 3/1204 358/1.15 |
| 2015/0264200 | A1* | 9/2015 | Ando | H04N 1/0097 358/1.15 |
| 2017/0118377 | A1* | 4/2017 | Takeda | H04N 1/4426 |

* cited by examiner

| USER INFORMATION | TAG INFORMATION | STARTUP APP INFORMATION | CONTROL COMMAND |
|---|---|---|---|
| USER A | CA0001 | APP A | COMMAND E |
| USER B | IP6459 | APP B | COMMAND A |
| USER K | Z10010 | APP A | COMMAND P |
| ⋮ | ⋮ | ⋮ | ⋮ |
| USER Z | 980A3 | APP K | COMMAND L |

SERVER APPARATUS, INFORMATION PROCESSING SYSTEM, AND INFORMATION PROCESSING METHOD FOR USER AUTHENTICATION

CROSS-REFERENCE TO RELATED APPLICATIONS

The present application claims priority under 35 U.S.C. § 119 to Japanese Patent Application No. 2016-006649, filed on Jan. 15, 2016 and Japanese Patent Application No. 2017-002923, filed on Jan. 11, 2017. The contents of which are incorporated herein by reference in their entirety.

BACKGROUND OF THE INVENTION

1. Field of the Invention

The present invention relates to a server apparatus, an information processing system, and a method of information processing.

2. Description of the Related Art

Today an IC card such as a contact type IC card that enables information processing by incorporating therein an integrated circuit (IC) is known. A control command between this IC card and a reader/writer varies in accordance with the type or the utilization of the IC card. Services provided using a library of a reader/writer provided in a personal computer apparatus, an image forming apparatus, or the like and applications for reading information from an IC card are known.

However, to provide a service using an IC card, a driver for controlling the IC card is required to be installed in a device. For this reason, a problem arises in which when a service is provided using many devices, the installation and the set-up of the driver are required for the respective devices, which requires much labor.

SUMMARY OF THE INVENTION

According to one aspect of the present invention, a server apparatus includes an acquiring unit, a reporting unit, a script acquiring unit, and a requesting unit. When a user issues a request for executing information processing to an information processing apparatus, the acquiring unit acquires unique information for uniquely identifying an information storage medium corresponding to the user through a network. The unique information is read from the information storage medium by a reading device. The reporting unit refers to a storage unit that stores therein pieces of unique information and applications relating to information processing in an associated manner with each other, so as to detect an application associated with the acquired unique information, and reports the acquired unique information to the detected application. The script acquiring unit acquires, from the application as a response to the report, a script that is generated by the application based on the unique information. The script is for reading storage information relating to the information processing from the information storage medium. The requesting unit transmits a request for executing the acquired script to the information processing apparatus.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
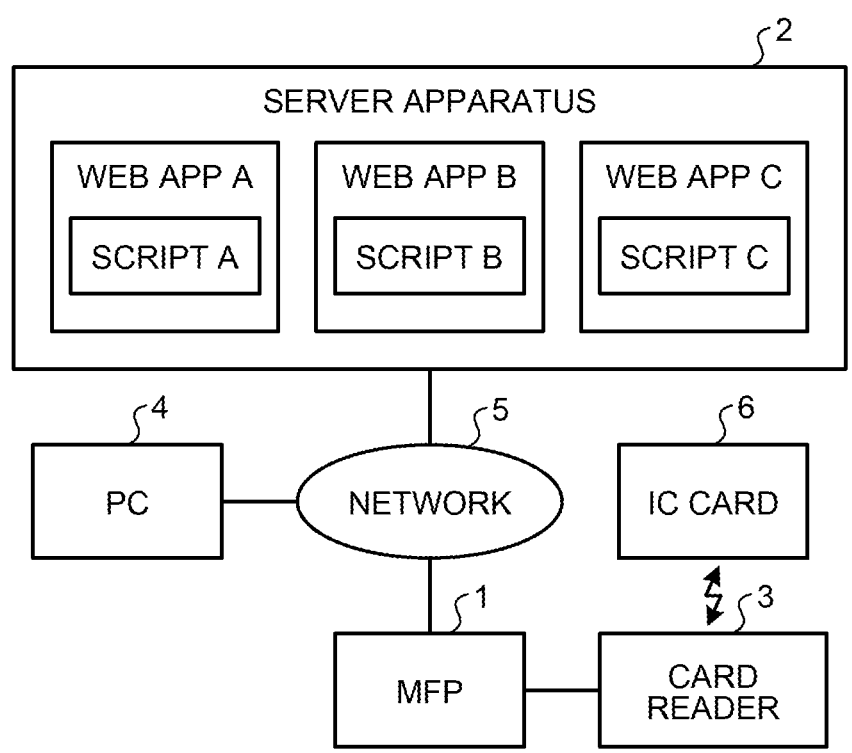
FIG. 1 is a system configuration diagram of an image forming system of a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An object of an embodiment is to provide a server apparatus that eliminates, in constructing a system that provides a service using many devices, the installation and the set-up of the driver for the respective devices.

An embodiment of the present invention will be described in detail below with reference to the drawings.

First Embodiment

System Configuration

FIG. 1 is a system configuration diagram of an image forming system of a first embodiment. As illustrated in this FIG. 1, the image forming system includes a multifunction peripheral (MFP) 1, a server apparatus 2, a card reader 3 (an example of a reading device), and a personal computer apparatus (PC) 4. The MFP 1 (an example of an information processing apparatus), the server apparatus 2, and the personal computer apparatus 4 are connected to each other in a wired or wireless manner over a network such as the Internet. The card reader 3 is connected to the MFP 1 through an external cable and performs noncontact wireless communication with a noncontact IC card 6 (an example of an information storage medium) to read information stored in the IC card 6. A contact IC card may be used for the IC card 6. The card reader 3 may be integrated with the MFP 1. Any card other than the IC card 6 may be used so long as it is a storage medium storing therein certain information.

The MFP 1 functions as an input/output terminal (an I/O terminal) of the image forming system of the embodiment. The MFP 1 has a plurality of image forming functions such as a copying function, a scanner function, a printer function, and a facsimile function, for example. Any device including one or a plurality of image forming functions such as a laser printer apparatus or a scanner apparatus may be used in place of the MFP 1.

The server apparatus 2 is a server apparatus present on a network such as what is called a cloud network. The server apparatus 2 includes one or a plurality of common Web application programs that a plurality of respective MFPs 1 can execute. The following may refer to the Web application program as a Web application or a Web app.

Each Web application is associated with an IC card 6 corresponding to a service to be provided. In other words, each IC card 6, from which the information is read by the card reader 3, is an IC card corresponding to the service to be provided by the corresponding Web application. Each Web application has a script for performing predetermined information processing, such as printing or reading of the information stored in the IC card 6. Each MFP 1 performs control to read the information stored in the IC card 6 and the predetermined information processing based on the script received from the Web application of the server apparatus 2.

The PC 4 includes a CPU, a RAM, a ROM, an HDD, a mouse device, and a keyboard. The CPU is the abbreviation of "central processing unit." The RAM is the abbreviation of "random access memory." The ROM is the abbreviation of "read only memory." The HDD is the abbreviation of "hard disk drive." The PC 4 has a Web browsing function by a Web browser stored in the HDD or the like. The PC 4 is operated by a user or the like who receives a service provided by the MFP 1, for example. As described below, upon detection of an operation to execute a Web application corresponding to a desired service by the user or the like, the PC 4 makes a request for executing the Web application to the server apparatus 2 and the MFP 1 using the Web browsing function.

Hardware Configuration of MFP

Figure 2:
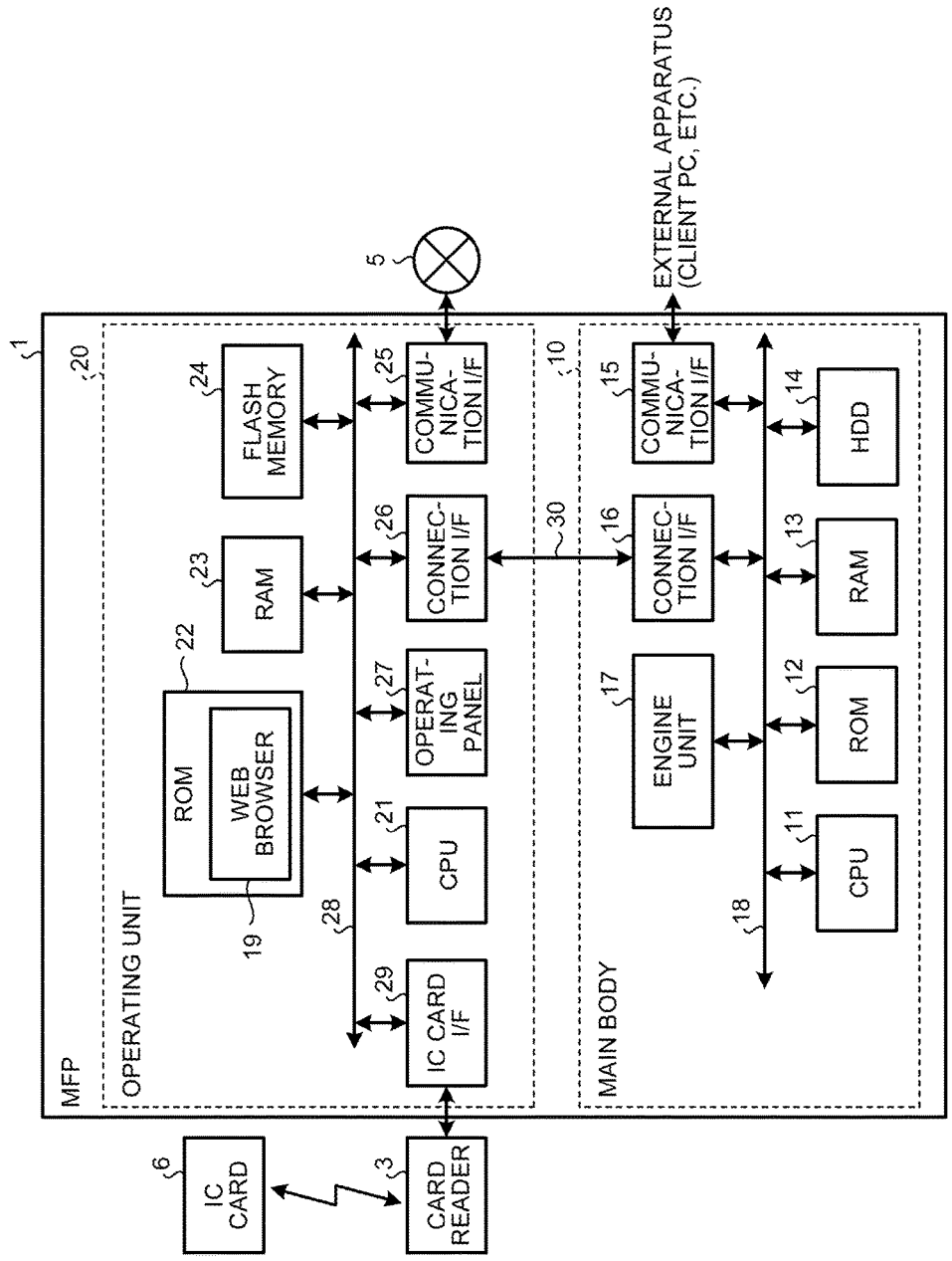
FIG. 2 is a hardware configuration diagram of an MFP.

FIG. 2 illustrates a hardware configuration diagram of the MFP 1. As illustrated in this FIG. 2, the MFP 1 includes a main body 10 including various kinds of functions such as a copying function, a scanner function, a facsimile function, and a printer function and an operating unit 20 that receives input corresponding to operations by a user. The main body 10 and the operating unit 20 are communicably connected to each other through an exclusive communication path 30. The communication path 30 may be based on the Universal Serial Bus (USB) standard, for example, or based on any standard regardless of being wired or wireless. The main body 10 may have one function or a plurality of functions out of the image forming functions such as the copying function, the scanner function, the facsimile function, and the printer function.

The operating unit 20 may be an electronic device that can execute complete information processing alone. As an example, the operating unit 20 may be an information processing terminal (a smart device) such as a smartphone or a tablet type terminal. In this case, the smart device used as the operating unit 20 functions as the operating unit of the MFP 1.

More specifically, the smart device used as the operating unit 20 is connected to the MFP 1 in a mountable and dismountable manner in place of an operating panel that has been conventionally fixed and installed as an operating panel exclusively for the MFP 1. In other words, the smart device used as the operating unit 20 is installed integrally with the MFP 1 at a certain position at which the operating panel of the MFP 1 is arranged, for example, while being dismountable (separable). Consequently, the smart device used as the operating unit 20 and the MFP 1 function as a single apparatus. When being detached from the MFP 1, the operating unit 20 performs wireless communication such as Bluetooth (registered trademark), Wi-Fi (registered trademark), or infrared communication with the MFP 1 to function as the operating unit of the MFP 1. Although the operating unit 20 is thus dismountable from the main body 10 in the MFP 1, the operating unit 20 may be provided fixed to the main body 10.

The main body 10 performs operations corresponding to the input received by the operating unit 20. The main body 10 can also communicate with an external apparatus such as the PC 4 and also performs operations corresponding to instructions received from the external apparatus.

Hardware Configuration of Main Body

The following describes a hardware configuration of the main body 10. As illustrated in FIG. 2, the main body 10 includes a CPU 11, a ROM 12, a RAM 13, and an HDD 14. The main body 10 also includes a communication interface (I/F) 15, a connection I/F 16, and an engine unit 17. The units 11 to 17 are connected to each other through a system bus 18.

The CPU 11 comprehensively controls the operation of the main body 10. The CPU 11 executes computer programs stored in the ROM 12, the HDD 14, or the like with the RAM 13 as a work area, thereby controlling the operation of the entire main body 10 to implement the various kinds of functions such as the copying function, the scanner function, the facsimile function, and the printer function.

The communication I/F 15 is an interface for connecting the external apparatus such as the PC 4 on a network 5 and the main body 10. The connection I/F 16 is an interface for connecting the operating unit 20 and the main body 10 through the communication path 30. Although FIG. 2 illustrates the communication path 30 in a wired manner, the operating unit 20 is provided mountable and dismountable on and from the main body 10 of the MFP 1 as described above. Thus, the communication path 30 functions as a wired communication path when the operating unit 20 is mounted on the MFP 1, whereas the communication path 30 functions as a wireless communication path when the operating unit 20 is dismounted from the MFP 1.

The engine unit 17 is hardware that performs general purpose information processing and processing other than communication for implementing the copying function, the scanner function, the facsimile function, and the printer function. The engine unit 17 includes a scanner (an image reading unit) that scans and reads document images, a plotter (an image forming unit) that performs printing on a sheet material such as paper, and a facsimile communicating unit that performs facsimile communication, for example. Specific options such as a finisher that sorts printed sheet materials and an automatic document feeder (ADF) that automatically feeds documents can further be included.

Hardware Configuration of Operating Unit

The following describes a hardware configuration of the operating unit 20. As illustrated in FIG. 2, the operating unit 20 includes a CPU 21, a ROM 22, a RAM 23, a flash memory 24, a communication I/F 25, a connection I/F 26, an operating panel 27, and an IC card I/F 29, which are connected to each other through a system bus 28.

The CPU 21 comprehensively controls the operation of the operating unit 20. The CPU 21 executes computer programs stored in the ROM 22, the flash memory 24, or the like with the RAM 23 as a work area to control the operation of the entire operating unit 20.

The storage unit, such as the ROM 22, stores therein a Web browsing application program (hereinafter, referred to as a "Web browsing AP"). The CPU 21 executes the Web browsing AP to implement a Web browser 19. As described below in detail, the Web browser 19 acquires a script for performing predetermined processing, such as reading of the information stored in the IC card 6 or printing, from the Web application (the reference numeral 39 in FIG. 3) stored in the server apparatus 2.

This example assumes that the Web browsing AP is stored in the ROM 22 or the like of the operating unit 20 of the MFP 1. However, the Web browsing AP may also be stored in the storage unit of the main body 10 of the MFP 1 such as the ROM 12, the RAM 13, or the HDD 14. In this case, the CPU 11 of the main body 10 executes the Web browsing AP stored in the ROM 12 or the like to implement the Web browser 19.

The Web browsing AP may be stored and provided in a computer-readable recording medium such as a compact disc read only memory (CD-ROM) or a flexible disk (FD) as an installable or executable file. The Web browsing AP may also be stored and provided in a computer-readable recording medium such as a compact disc recordable (CD-R), a DVD, a Blu-ray Disc (registered trademark), or a semiconductor memory. The DVD is the abbreviation of "digital versatile disc." The Web browsing AP may also be provided through a network such as the Internet. The Web browsing AP may also be downloaded through a network, be installed in the operating unit 20 (or the main body 10), and be executed. The Web browsing AP may also be embedded and provided in a ROM, for example, within a device. Part or the whole of the functions of the Web browsing AP may be implemented by hardware such as a semiconductor integrated circuit (IC).

The communication I/F 25 is an interface for communicating with the server apparatus 2 on the network 5, for example. The connection I/F 26 is an interface for connecting the main body 10 and the operating unit 20 through the communication path 30.

The operating panel 27 includes a liquid crystal display (LCD) including a touch sensor. The operating panel 27 receives various kinds of input corresponding to operations by the user and displays various kinds of information such as information corresponding to the received input, information indicating the operational situation of the MFP 1, and information indicating a setting state. The operating panel 27 displays operational instructions for the IC card 6 to the user and the like. The operating panel 27 may also include an organic EL display device including a touch sensor. The operating panel 27 may also be provided with an operating unit such as hardware keys and a display unit such as lamps.

The IC card I/F 29 is an interface that connects the card reader 3 and the operating unit 20. This example assumes that the card reader 3 and the operating unit 20 are connected to each other through the IC card I/F 29. However, the IC card I/F 29 may be provided in the main body 10 to connect the card reader 3 and the main body 10 through the IC card I/F 29.

Hardware Configuration of Server Apparatus

Figure 3:
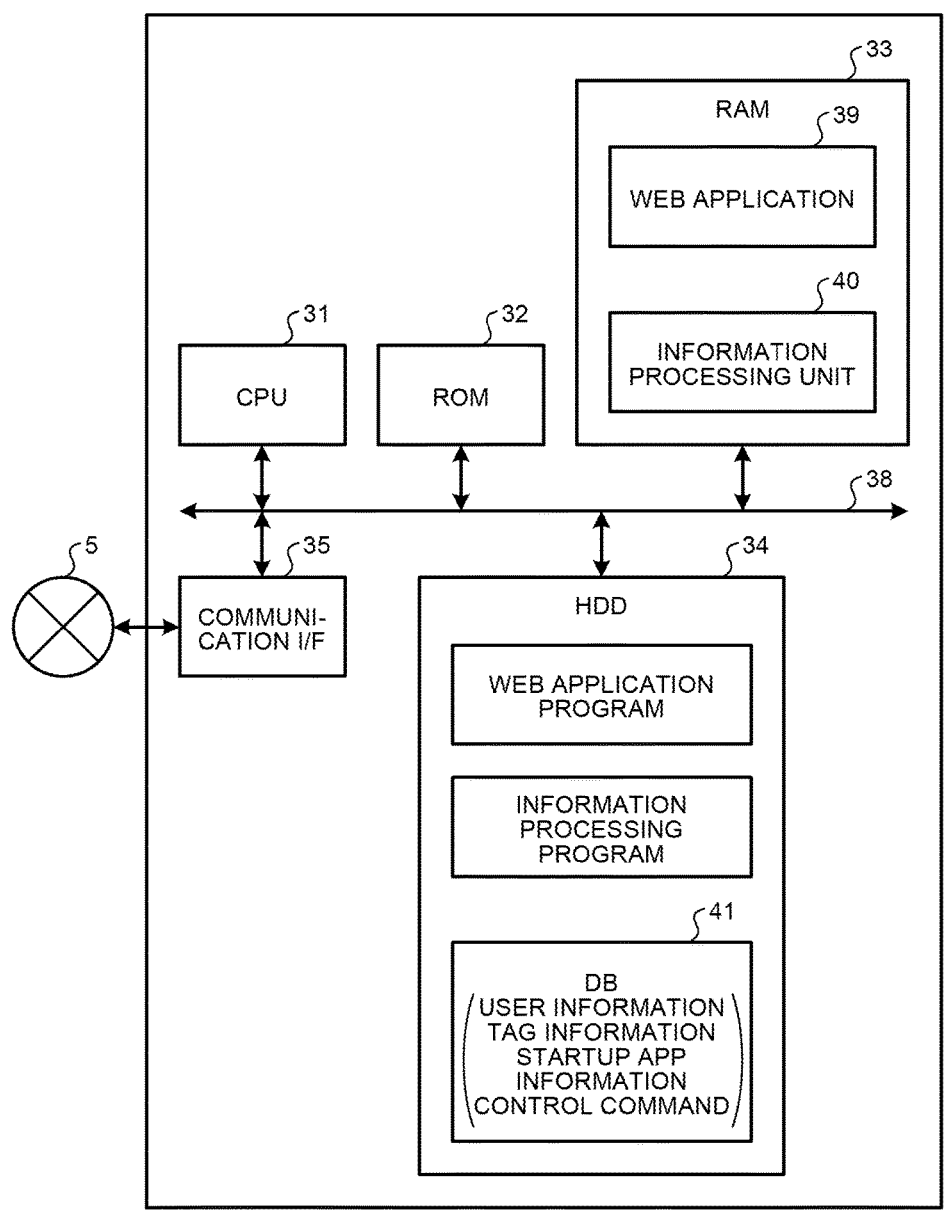
FIG. 3 is a hardware configuration diagram of a server apparatus.

FIG. 3 illustrates a hardware configuration diagram of the server apparatus 2. As illustrated in this FIG. 3, the server apparatus 2 includes a CPU 31, a ROM 32, a RAM 33, an HDD 34, and a communication I/F 35. The CPU 31 to the communication I/F 35 are connected to each other through a system bus 38. The HDD 34 stores therein one or a plurality of Web application programs that provide the user with certain services through the MFP 1. The HDD 34 stores therein an information processing program for performing information processing that provide the user with the certain services together with the Web applications.

The HDD 34 includes a storage area of a database (DB) 41. The DB 41 (an example of a storage unit) stores therein pieces of user information of users respectively corresponding to the IC cards 6, pieces of tag information (an example of unique information), and pieces of startup app information each indicating the Web application to be operated for the corresponding IC card 6. The DB 41 also stores therein, in an associated manner with those pieces of information, a control command for performing predetermined processing, such as reading card information corresponding to the user information from the IC card 6 or printing.

Figures 4, 5:
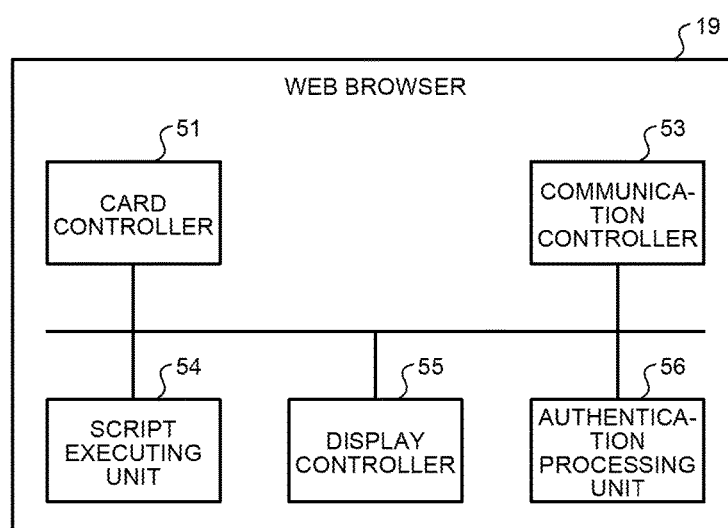
FIG. 4 is a diagram of an example of a database (DB) stored in an HDD of the server apparatus.
FIG. 5 is a functional block diagram of a Web browser stored in an operating unit of the MFP.

FIG. 4 illustrates an example of the pieces of information stored in the DB 41. The user information is information for identifying a user or a group to which the user belongs such as a user name, user identification information (a user ID), a company name, and a department to which the user belongs. The example in FIG. 4 illustrates an example in which pieces of user information, such as User A and User K, etc., are stored in the DB 41. The tag information is information to be provided upon accessing a tag area of the IC card 6 in accordance with a legitimate procedure. The tag information is information uniquely given to each IC card 6 in order to physically identify the IC card 6 and is information that can be acquired without limitation through an established communication line. The example in FIG. 4 illustrates an example in which pieces of tag information, such as CA0001 and 980A3, etc., are stored in the DB 41.

The startup app information is information indicating an application to be operated in correspondence with each IC card 6. The example in FIG. 4 illustrates an example in which pieces of startup app information, such as App A and App K, etc., are stored in the DB 41. The control command is information for performing predetermined information processing, such as reading the card information corresponding to the user that is indicated by the user information and tag information included in the card information stored in the IC card 6 or printing. The example in FIG. 4 illustrates an example in which control commands, such as Command E and Command P, etc., are stored in the DB 41.

The CPU 31 loads the Web application programs and the information processing program in the RAM 33 and executes the Web application programs and the information processing program. In FIG. 3, a Web application 39 and an information processing unit 40 illustrated in the RAM 33 indicate the Web application program and the information processing program, respectively, loaded by the CPU 31.

The Web application programs and the information processing program may be stored and provided in a computer-readable recording medium such as a CD-ROM or a flexible disk (FD) as an installable or executable file. The Web application programs and the information processing program may be stored and provided in a computer-readable recording medium such as a CD-R, a DVD, a Blue-ray Disc (registered trademark), or a semiconductor memory. The DVD is the abbreviation of "digital versatile disc."

The Web application programs and the information processing program may also be provided through a network such as the Internet. The Web application programs and the information processing program may also be downloaded through a network, be installed in the operating unit 20 (or the main body 10), and be executed. The Web application programs and the information processing program may also be embedded and provided in a ROM, for example, within a device. Part or the whole of the functions of the Web application programs and the information processing program may be implemented by hardware such as a semiconductor integrated circuit (IC).

The service provided by each Web application 39 corresponds to each corresponding IC card 6 from which the information is read by the card reader 3. In other words, each IC card 6 is an IC card corresponding to the service to be provided by the corresponding Web application 39. Each Web application 39 generates a script for performing predetermined processing, such as reading of the IC card 6 or printing, as described hereinafter.

Functions of Web Browser

FIG. 5 is a functional block diagram of the Web browser 19 stored in the operating unit 20 of the MFP 1. The CPU 21 of the operating unit 20 functions as a card controller 51, a communication controller 53, a script executing unit 54, a display controller 55, and an authentication processing unit 56 based on a Web browsing program. The card controller 51 issues a control command for reading the information stored in the IC card 6 based on the script generated by the server apparatus 2. The communication controller 53 performs the communication control of the communication I/F 25 to control communication with the PC 4 and with the server apparatus 2. The script executing unit 54 executes the script generated by the server apparatus 2. The display controller 55 performs the display control of the operating panel 27 so as to display operational instructions for the IC card 6 to the user and to display an input screen for the authentication information of the user. The authentication processing unit 56 displays the input screen for the authentication information on the operating panel 27 through the display controller 55. The authentication processing unit 56 reports the authentication information input through the operating panel 27 to the card reader 3. As described below, the card reader 3 accesses the IC card 6 with the reported authentication information added to the control command to read the card information that requires the authentication information from the IC card reader 6.

Functions of Web Application

Figure 6:
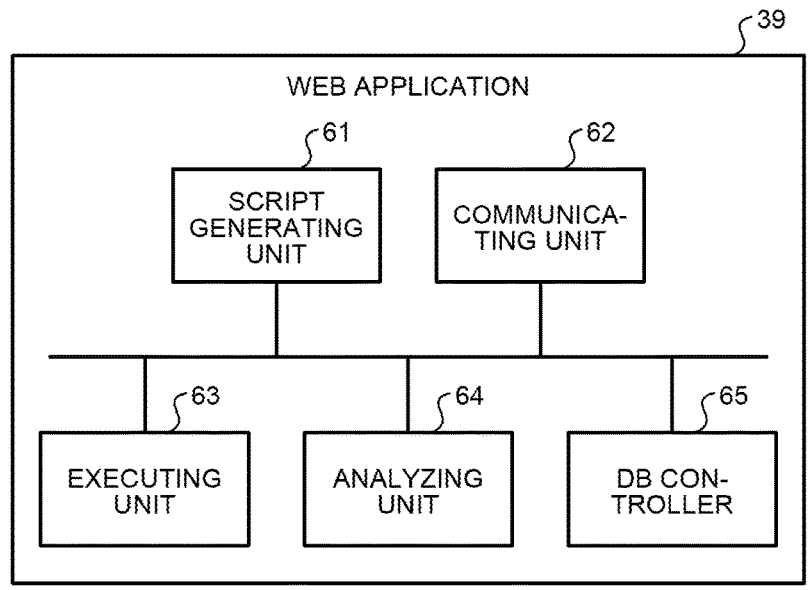
FIG. 6 is a functional block diagram of a Web application implemented by executing a Web application program by a CPU of the server apparatus.

FIG. 6 is a functional block diagram of the Web application 39 implemented by executing the Web application program (an example of a reporting destination) by the CPU 31 of the server apparatus 2. As illustrated in this FIG. 6, the CPU 31 functions as a script generating unit 61, a communicating unit 62, an executing unit 63, an analyzing unit 64, and a DB controller 65 based on the Web application program. The script generating unit 61 generates the script for performing control to read the IC card 6 and the like dynamically or statically using the control command stored in the DB 41 of the HDD 34. The communicating unit 62 performs communication control with the information processing unit 40.

The executing unit 63 performs control to execute printing and the like designated through the PC 4 by the user. The analyzing unit 64 analyzes the execution result of the script. The DB controller 65 performs control to write and read the tag information of the IC card 6 and the user information of a user for which the use of the IC card 6 is permitted into and from the DB 41 of the HDD 34. The DB controller 65 performs control to write and read the startup app information indicating the Web application program that is permitted to the IC card 6 by an administrator or the like or designated by the user into and from the DB 41 of the HDD 34 as the Web application for the IC card 6.

Functions of Information Processing Unit

Figure 7:
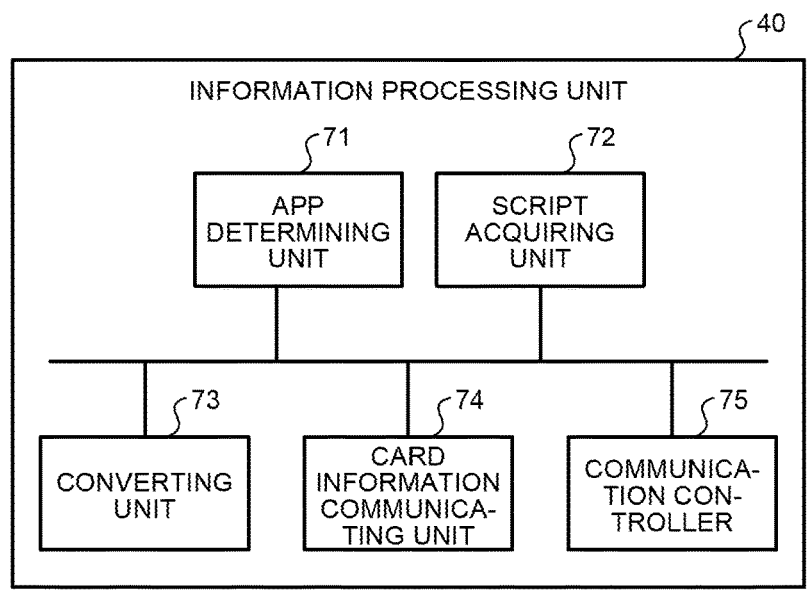
FIG. 7 is a functional block diagram of an information processing unit implemented by executing an information processing program by the CPU of the server apparatus.

FIG. 7 is a functional block diagram of the information processing unit 40 implemented by executing the information processing program by the CPU 31 of the server apparatus 2. As illustrated in this FIG. 7, the CPU 31 functions as an app determining unit 71, a script acquiring unit 72 (an example of a script acquiring unit), a converting unit 73, a card information communicating unit 74, and a communication controller 75 (an example of an acquiring unit and a requesting unit) based on the information processing program.

The app determining unit 71 detects a Web application associated with the tag information read from the IC card 6 in the DB 41 and determines the Web application to be the Web application 39 to which the tag information is to be reported. The script acquiring unit 72 acquires the script generated by the Web application 39. The converting unit 73 performs conversion on the script acquired by the script acquiring unit 72 to a data format executable by the Web browser 19 of the MFP 1. The card information communicating unit 74 communicates the tag information (an example of unique information), the card information, and the like read from the IC card 6 with the MFP 1.

Triggered by an issuance of a request for executing information processing on the Web application, the card information communicating unit 74 (an example of a reporting unit) detects the startup app information, which is read by the card reader 3 from the IC card 6 and is associated with the tag information transmitted through the network 5 in the DB 41, and reports the tag information to the Web application indicated by the detected startup app information. The card information communicating unit 74 may report the tag information together with the user information to the detected startup app information. Triggered by execution of the script by the MFP 1 through the network 5, the card information communicating unit 74 reports the card information, which is read from the IC card 6 through the card reader 3 and is transmitted through the network 5, to the Web application to which the tag information is reported. The communication controller 75 performs control on the communication with the MFP 1 and the communication with the PC 4. The communication controller 75 issues a request for executing the script that is generated by the script generating unit 61 of the Web application and is acquired by the script acquiring unit 72 of the information processing unit 40 to the Web browser 19.

Description of Overall Operation using Flowchart

Figure 8:
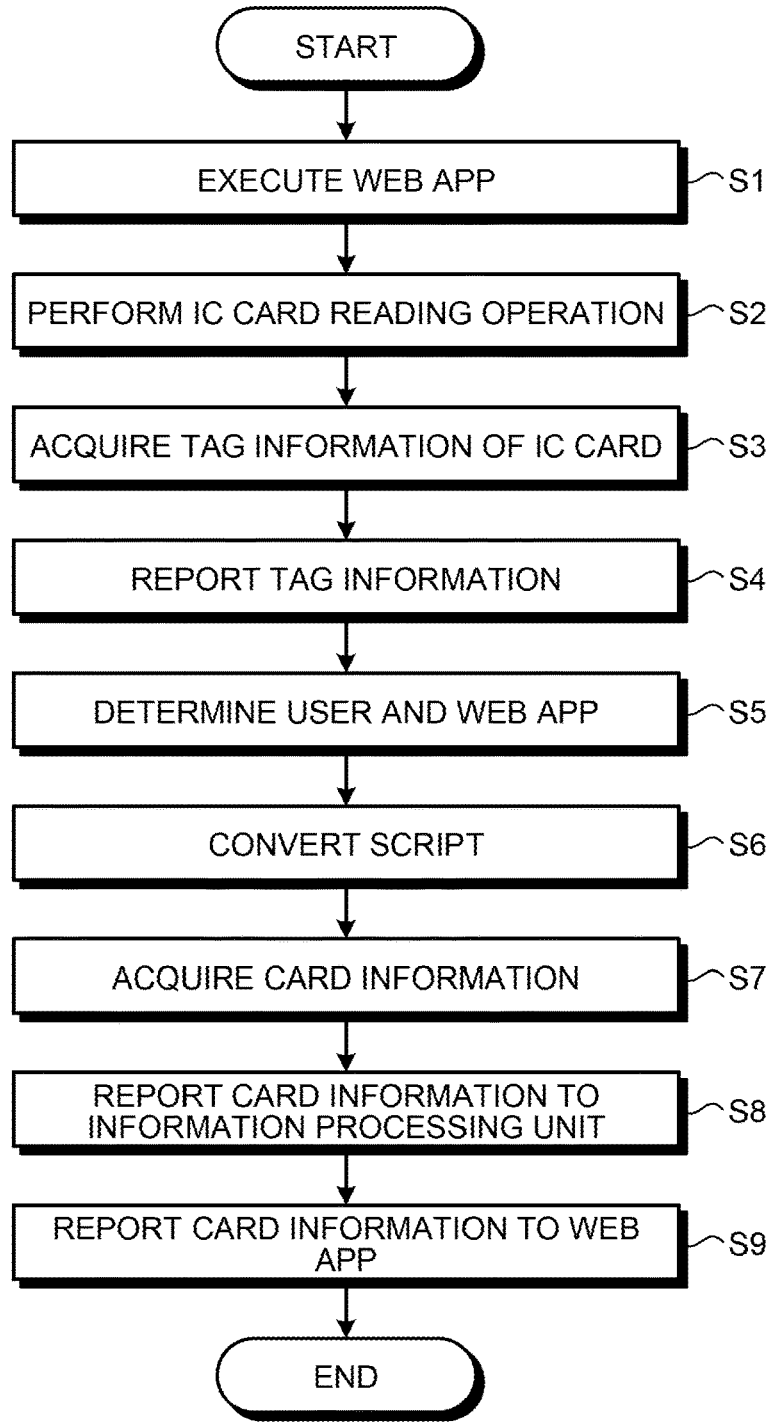
FIG. 8 is a flowchart of an overall operational procedure of the image forming system of the first embodiment.

FIG. 8 is a flowchart of an overall operational procedure of the image forming system of the first embodiment. In this FIG. 8, when the user performs an operation to start up a desired Web application of the PC 4 and an operation to execute desired printing, the PC 4 transmits the request for starting up the Web application designated by the user and the request for executing services such as the printing to the server apparatus 2 through the Web browser at Step S1. The server apparatus 2 once stores therein the request for executing the printing and the like from the user and enters an execution waiting state.

Next, after transmitting a request for executing the desired printing, the user moves to the front of the MFP 1 and brings the carried IC card 6 close to the card reader 3 to perform a reading operation. The card reader 3 performs noncontact wireless communication (NFC: Near Field Communication), for example, with the IC card 6 at Step S2. The card reader 3 acquires the tag information of the IC card 6 at Step S3. The card reader 3 may acquire the tag information together with the user information from the IC card 6 when the user information is also stored in advance in the IC card 6.

Figure 9:
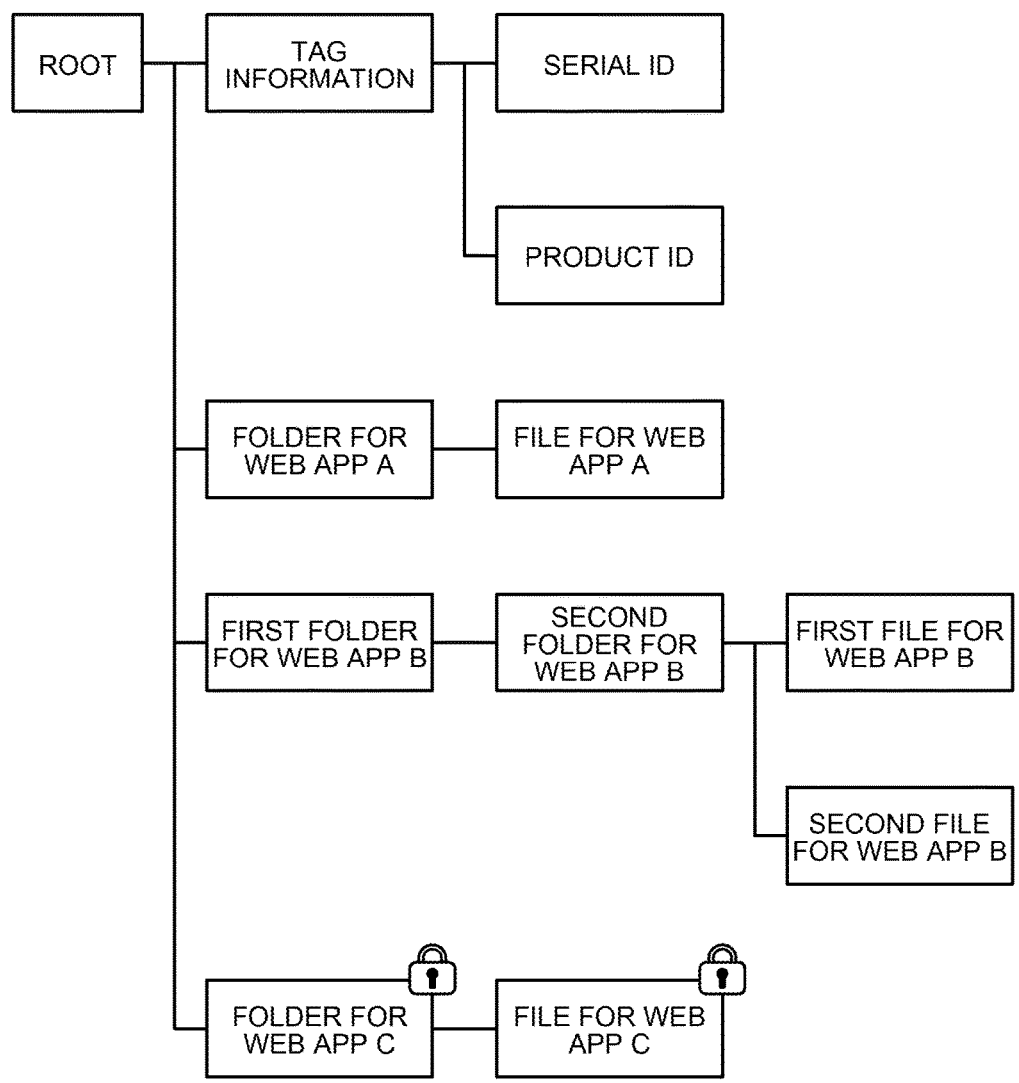
FIG. 9 is a diagram of an example of a hierarchical file structure of an IC card.

FIG. 9 is a diagram of an example of a hierarchical file structure of the IC card 6. As an example, the IC card 6 illustrated in FIG. 9 has a tag area that stores therein the tag information unique to each of the IC cards 6. This tag area contains the tag information unique to the IC card 6 such as a product ID given by the manufacturer of the IC card 6 and a serial ID given by the issuer of the IC card 6. This tag information is information provided when the IC card 6 is accessed in accordance with a legitimate procedure. In other words, the tag information is information that is stored in the tag area of the IC card 6 and that can be acquired without limitation through a communication line established with the IC card 6.

In the image forming system of the first embodiment, the IC card 6 includes folders and files for the respective applications. In the example in FIG. 9, respective folders and files for Web App A, Web App B, and Web App C correspond to these folders and files for the respective applications. As described hereinafter, the respective folders and files for Web App B and Web App C can be read from the IC card 6 using certain scripts generated by Web App B or Web App C.

In the example in FIG. 9, the folder for Web App B includes a plurality of folders such as a first folder for Web App B and a second folder for Web App B as an example. The folder and the file for Web App C are a folder and a file with limited accessibility.

As described above, the tag information is information that can be acquired simply by accessing the tag area of the IC card 6 in accordance with the legitimate procedure, whereas the folders and the files for the respective applications are provided to the corresponding applications. In other words, Web Application A can access the folder for Web App A, and similarly, Web Application B can access the folder for Web App B. Consequently, the folders and the files for the respective applications are folders and files exclusively for the corresponding applications in fact, and other Web applications cannot access them. The folders and the files for the respective Web applications store therein the card information, such as information including at least one of a user name, a sex, an age, and a department to which a user belongs and print information permitted to the user including at least one of the number of printing copies and print color (monochrome/color), for example.

Next, at Step S4 in the flowchart in FIG. 8, the card controller 51 of the Web browser 19 of the MFP 1 acquires the tag information of the IC card 6 acquired by the card reader 3 and reports the tag information to the server apparatus 2 through the communication I/F 25 and the network 5. As described above, the DB 41 of the HDD 34 of the server apparatus 2 stores therein the pieces of tag information of the IC cards 6, the pieces of user information of the users as owners, the pieces of startup app information each indicating the Web application assigned to the IC card 6, and the like in an associated manner with each other. The startup app information is information indicating the Web application that can access the folder and the file stored in the IC card 6. The app determining unit 71 of the information processing unit 40 of the server apparatus 2 refers to the DB 41 based on the reported tag information to determine (detect) the Web application to be started up that is associated with the reported tag information at Step S5. The card information communicating unit 74 reports the tag information to the determined (detected) Web application. The card information communicating unit 74 may read the user information associated with the tag information from the DB 41 and report the tag information and the user information to the detected Web application.

Next, at Step S6, the script generating unit 61 of the Web application 39 of the server apparatus 2 generates a script for reading the card information from the IC card 6 using the tag information of the IC card 6 and reports the script to the information processing unit 40. Specifically, as an example, the script generating unit 61 detects a control command associated with the tag information of the IC card 6 in the DB 41. The script generating unit 61 then generates a script for reading the card information from the IC card 6 based on the detected control command and reports the script to the information processing unit 40. When the user information is also reported from the card information communicating unit 74, the script generating unit 61 may detect a script associated with the reported user information and tag information of the IC card 6 in the DB 41.

The converting unit 73 of the information processing unit 40 converts the reported script into a data format executable by the Web browser 19 of the MFP 1. As an example, the Web application 39 converts the script into a text format in order to enable data transmission and reception on the HTTP protocol with the Web browser 19.

At Step S7, the script executing unit 54 of the Web browser 19 of the MFP 1 executes the script generated by the server apparatus 2 over the network 5. With this, the control command corresponding to the executed script is reported to the IC card 6 through the card reader 3. The above-described card information that is for the Web application 39 determined at Step S5 and that corresponds to the control command is acquired from the IC card 6. The card information acquired from the IC card 6 is transmitted from the MFP 1 to the server apparatus 2.

Figure 10:
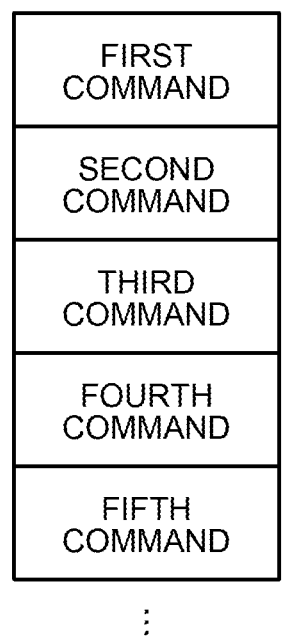
FIG. 10 is a diagram of a structure of a script generated by the server apparatus.
Figure 11:
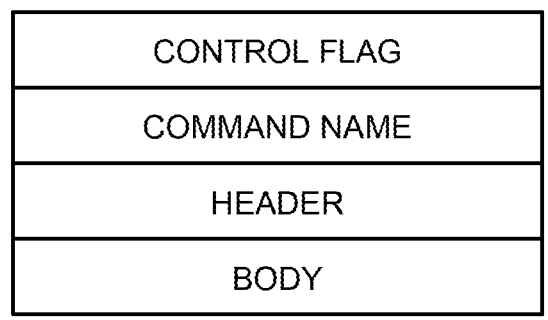
FIG. 11 is a diagram of a format of each control command.

FIG. 10 is a diagram of a structure of the script generated by the script generating unit 61 of the server apparatus 2. As illustrated in this FIG. 10, the script contains one or a plurality of control commands (first to nth control commands (n is a natural number of 2 or more)). FIG. 11 is a diagram of a format of each control command. As illustrated in this FIG. 11, each control command contains a control flag that makes a request of execution to the Web browser 19 of the MFP 1 and a command name that makes a request of control to the card reader 3. Each control command contains a header and a body that make a request to the IC card 6. The body may be omitted as needed.

The control command may arrange a plurality of control flags at the top. An execution condition may be designated for the control flag. The first command to the third command in FIG. 10 may be sequentially executed, and based on the return value of data replied from the IC card 6 as a result of the request of making a request of the third command to the IC card 6, the fourth command or the fifth command may be executed selectively (the command to be executed may be branched), for example.

Next, the communication controller 75 of the information processing unit 40 of the server apparatus 2 receives the card information acquired from the IC card 6 at Step S8. The card information communicating unit 74 of the information processing unit 40 reports the received card information to the Web application 39 at Step S9. The executing unit 63 of the Web application 39 performs control to execute the printing and the like designated by the user through the Web browser 19 of the MFP 1 based on the card information received from the MFP 1.

Description of Overall Operation using Sequence Diagram

Figure 12:
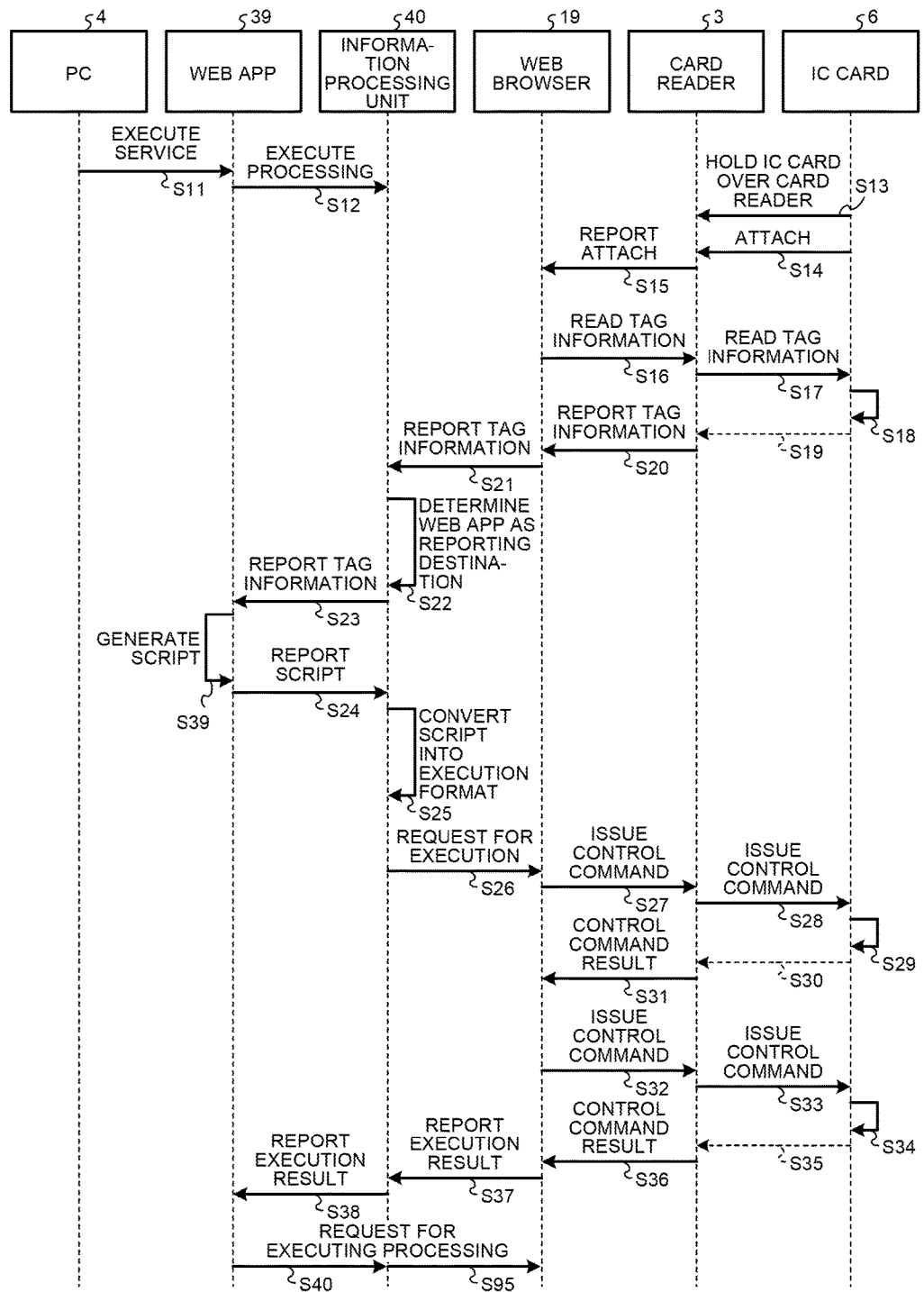
FIG. 12 is a sequence diagram of an operational procedure of the image forming system of the first embodiment.

FIG. 12 is a sequence diagram of an operational procedure of the image forming system of the first embodiment. With reference to this FIG. 12, the following again describes the operational procedure of the image forming system of the first embodiment. First, when the user performs an operation to execute a desired Web application through the PC 4, the PC 4 makes a request for executing the printing (a request for executing the Web application 39) designated by the user to the server apparatus 2 through the Web browser of the PC 4 at Step S11. In the server apparatus 2, the communicating unit 62 of the Web application 39 receives the request for executing the printing from the PC 4 through the communication I/F 35 and reports the request for executing the printing to the information processing unit 40 (Step S12). The information processing unit 40 acquires the request for executing the printing reported from the Web application 39 by the communication controller 75 and once stores the request for executing the printing in a storage unit such as the RAM 33 or the HDD 34.

Figure 13:
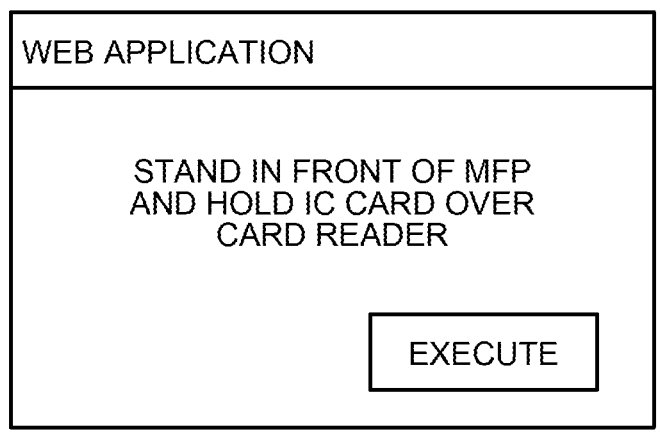
FIG. 13 is a diagram of an example of a message that a PC of a user displays on a monitor device and that prompts for noncontact wireless communication between the IC card and a card reader.

Next, the PC 4 of the user displays a message that prompts for noncontact wireless communication between the IC card 6 and the card reader 3 as illustrated in FIG. 13, for example, on a monitor device. FIG. 13 is an example of a message saying "Stand in front of MFP and hold IC card over card reader." Following this message, the user moves to the front of the MFP 1.

Figure 14:
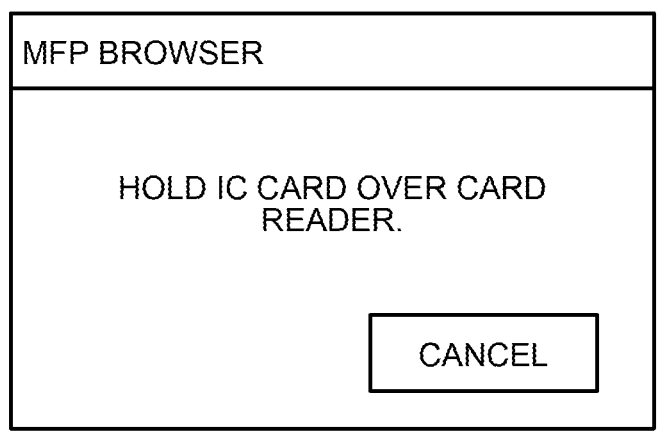
FIG. 14 is a diagram of an example of a message that is displayed on an operating panel of the MFP and that prompts for noncontact wireless communication between the IC card and the card reader.

The display controller 55 of the Web browser 19 of the MFP 1 displays a message that prompts for noncontact wireless communication between the IC card 6 and the card reader 3 as illustrated in FIG. 14, for example, on the operating panel 27. FIG. 14 is an example of a message saying "Hold IC card over card reader."

The user who has moved to the front of the MFP 1 performs a reading operation that brings the carried IC card 6 close to the card reader 3 (Step S13). When the noncontact wireless communication becomes enabled owing to the IC card 6 that has been brought close thereto (Step S14), the card reader 3 performs attach reporting indicating that the noncontact wireless communication has become enabled with the IC card 6 to the Web browser 19 of the MFP 1 (Step S15).

Figure 15:
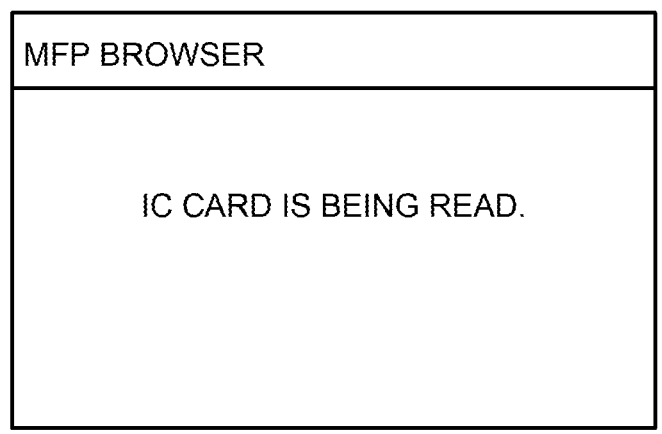
FIG. 15 is a diagram of an example of a message that a display controller of a Web browser of the MFP displays on the operating panel while tag information and card information of the IC card are being read by the card reader and that indicates that the IC card is being read.
Figure 16:
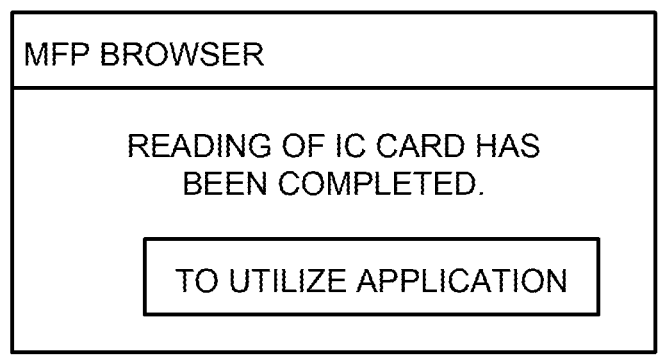
FIG. 16 is a diagram of an example of a message that the display controller of the Web browser of the MFP displays on the operating panel when the reading of the tag information or the card information of the IC card by the card reader has been completed and that indicates that the reading has been completed.

Upon reception of the attach reporting, the card controller 51 of the Web browser 19 makes a request for reading the tag information to the card reader 3 (Step S16). The card reader 3 reads the tag information from the IC card 6 following the request for reading from the Web browser 19 (Step S17) and reports the tag information to the Web browser 19 (Step S18 to Step S20). The display controller 55 of the Web browser 19 of the MFP 1 displays a message indicating that the information of the IC card 6 is being read such as "IC card is being read." as illustrated in FIG. 15, for example, on the operating panel 27 while the tag information and the card information of the IC card 6 are being read by the card reader 3. Upon completion of the reading of the tag information and the card information of the IC card 6 by the card reader 3, the display controller 55 displays a message indicating that the reading of the information of the IC card 6 has been completed such as "Reading of IC card has been completed." as illustrated in FIG. 16, for example, on the operating panel 27.

Next, the communication controller 53 of the Web browser 19 reports the tag information read from the IC card 6 to the information processing unit 40 of the server apparatus 2 through the communication I/F 25 and the network 5 (Step S21). The card information communicating unit 74 of the information processing unit 40 performs communication control on the communication I/F 35 so as to receive the reported tag information. The app determining unit 71 of the information processing unit 40 refers to the DB 41 based on the reported tag information to detect the Web application to be started up that is associated with the reported tag information. The app determining unit 71 of the information processing unit 40 determines the detected Web application 39 to be the Web application to which the tag information is to be reported (Step S22). The communication controller 75 of the information processing unit 40 reports the tag information to the Web application 39 at Step S23 (Step S23).

Next, the script generating unit 61 of the Web application 39 generates a script that is for a predetermined information processing and that corresponds to the reported tag information (Step S39). The communicating unit 62 of the Web application 39 reports the generated script to the information processing unit 40 (Step S24). The information processing unit 40 acquires the reported script by the script acquiring unit 72. The information processing unit 40 converts the reported script into a data format executable by the Web browser 19 of the MFP 1 by the converting unit 73 (an example of a converting unit) (Step S25). As an example, the converting unit 73 converts the script into a text format in order to enable data transmission and reception on the HTTP protocol with the Web browser 19. The communication controller 75 makes a request for executing the script that has been converted into an execution format to the Web browser 19 of the MFP 1 through the communication I/F 35 and the network 5 (Step S26).

The script executing unit 54 of the Web browser 19 of the MFP 1 executes the script generated by the server apparatus 2 to issue the control command of the IC card 6 to the card reader 3, for example (Step S27). The card reader 3 reads the card information such as a user name and a department to which a user belongs stored in the folder for the corresponding Web app from the IC card 6 based on the control command, and the card reader 3 reports, as a control command result, the card information to the Web browser 19 (Step S28 to Step S31). The Web browser 19, to which the control command result has been reported from the card reader 3, again issues the control command and receives the control command result if necessary (Step S32 to Step S36).

The communication controller 53 of the Web browser 19 reports the card information received from the card reader 3 to the Web application 39 through the information processing unit 40 of the server apparatus 2 (report execution result: Step S37 to Step S38). The executing unit 63 of the Web application 39 generates a script for executing the printing designated by the user and transmits the script to the information processing unit 40 (Step S40). The communication controller 75 of the information processing unit 40 converts the script for executing the printing received from the Web application 39 into a data format executable by the web browser 19 as described above; transmits the converted script to the MFP 1; and performs control to execute the printing in the MFP 1 (Step S95). In accordance with the request for executing the printing received from the Web application 39 through the Web browser 19, the CPU 11 of the MFP 1 controls the engine unit 17 so as to execute the printing and the like.

Operation to Generate Script

Figure 17:
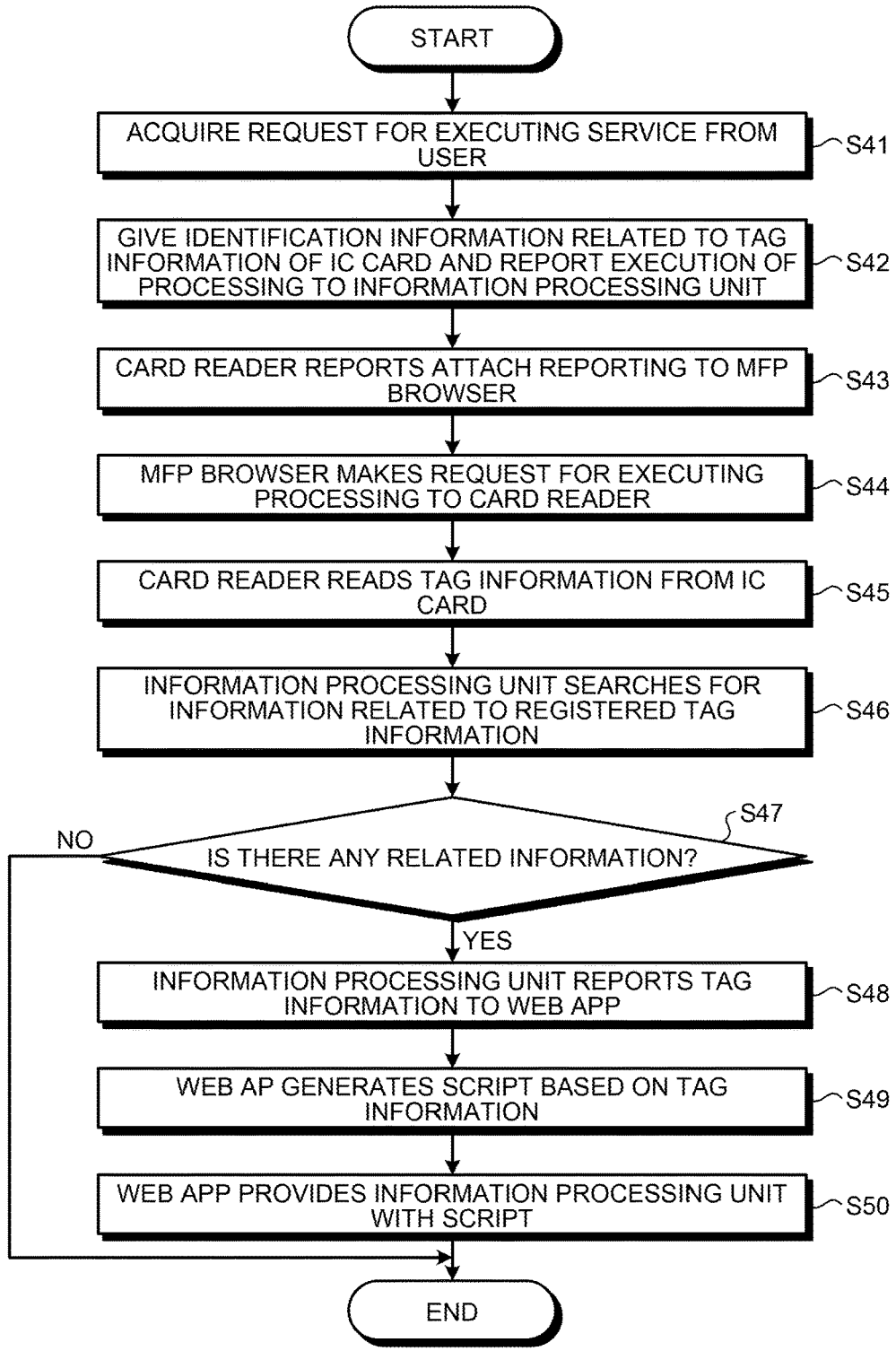
FIG. 17 is a flowchart of an operational procedure for generating a script in the Web application.

FIG. 17 is a flowchart of an operational procedure for generating the script (the control command) in the Web application 39. The Web application 39 of the server apparatus 2 receives a request for executing the printing and the like using the IC card 6 from the PC 4 of the user at Step S41. At Step S42, the Web application 39 gives identification information related to the tag information of the IC card 6 to this request for execution, once holds the request for execution, and reports the execution of the processing to the information processing unit 40.

At Step S43, the card reader 3 to which the IC card 6 has been brought close by the user performs attach reporting to the Web browser 19 of the MFP 1. At Step S44, the Web browser 19 makes a request for executing processing to read the tag information to the card reader 3. At Step S45, the card reader 3 reads the tag information from the IC card 6. The Web browser 19 reports the tag information to the server apparatus 2.

At Step S46, the information processing unit 40 of the server apparatus 2 refers to the DB 41 based on the reported tag information to search for Web application information (related information) to be started up that is associated with the tag information. If there is no related information in the DB 41 (No at Step S47), the processing of the flowchart in FIG. 17 ends. If there is any related information in the DB 41 (Yes at Step S47), the information processing unit 40 reports the tag information to the Web application 39 thus searched for (that is, the Web application to be started up) (Step S48). The information processing unit 40 may report the tag information and the user information detected from the DB 41 based on the tag information to the Web application 39 thus searched for.

At Step S49, the Web application 39 generates a script for a user corresponding to the tag information. Specifically, the Web application 39 generates a script for performing predetermined processing, such as reading of the card information stored in the IC card 6 or printing. The web application 39 generates the script in a text format having high affinity with the HTTP protocol. One or a plurality of scripts may be generated. The Web application 39 transmits the generated script to the information processing unit 40 (Step S50). As described above, the information processing unit 40 converts the script received from the Web application 39 into the execution format of the Web browser 19 of the MFP 1 and makes a request for executing the script to the MFP 1.

In generating the script for reading necessary information from the IC card 6, the Web application 39 requires input of authentication information (PIN: personal identification number), and when the authentication information is registered in the DB 41, the script including this authentication information is generated. With this, user authentication can be automatically executed in a layer (a processing layer) below the information processing unit 40.

Conversion of Script and Operation to Read Card Information

Figure 18:
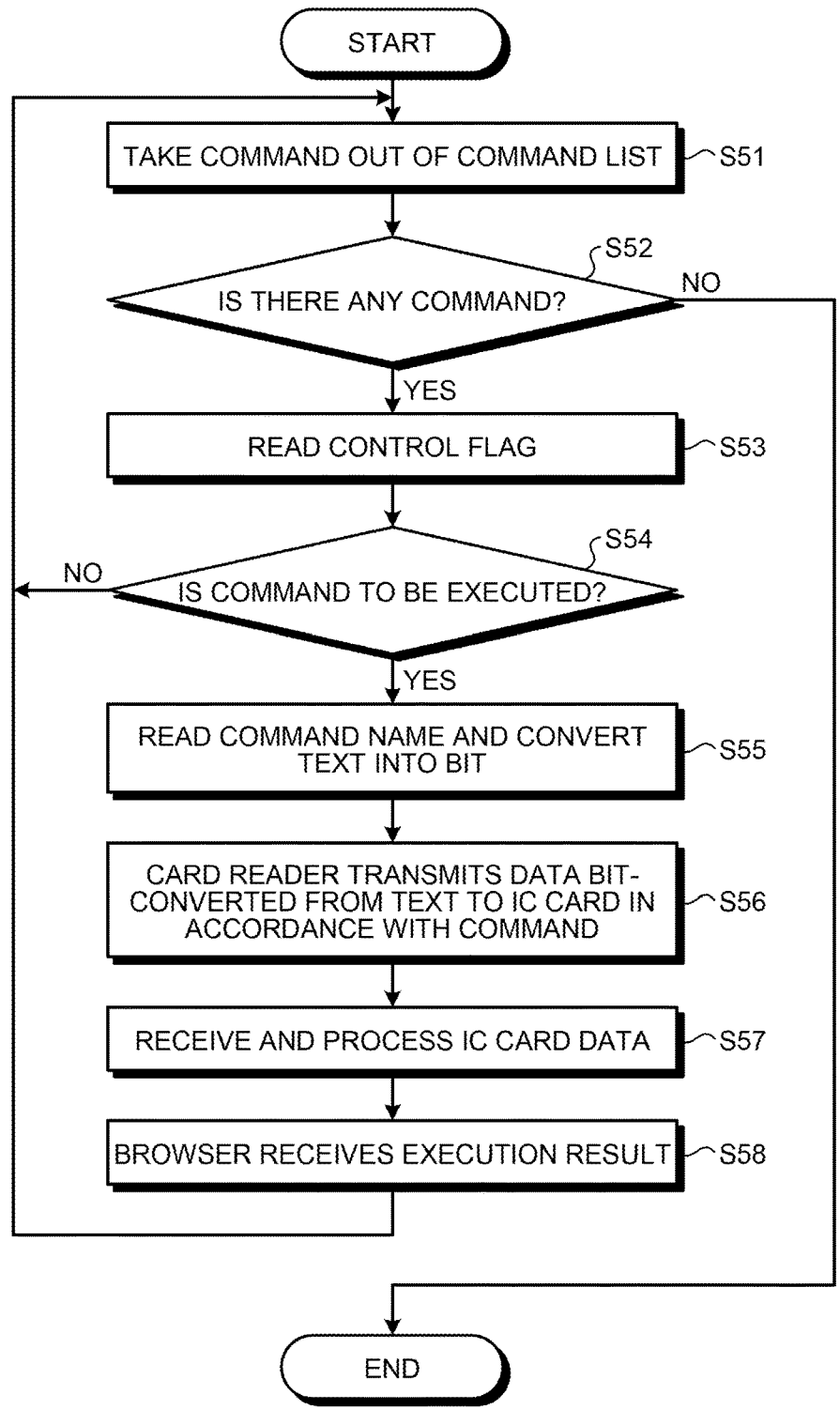
FIG. 18 is a flowchart of converting the script and an operational procedure for reading the card information of the IC card.

FIG. 18 is a flowchart of converting the script and an operational procedure for reading the card information of the IC card 6. Upon reception of the script from the Web application 39, the information processing unit 40 of the server apparatus 2 divides the script into commands at Step S51. The information processing unit 40 determines whether there is any command at Step S52. If there is no command (No at Step S52), the information processing unit 40 ends the processing of the flowchart in FIG. 18. If there is any command (Yes at Step S52), the information processing unit 40 reads the control flag of the command at Step S53 and determines whether the command is to be executed at Step S54. If the command is not to be executed by the card reader 3 (No at Step S54), the information processing unit 40 returns the process to Step S51.

In contrast, if the command is a command to be executed by the card reader 3 (Yes at Step S54), the information processing unit 40 converts the command name, the header, and the body (refer to FIG. 10 and FIG. 11) described in text from the text format into a bit format so as to be recognized by the web browser 19 at Step S55 and transmits them to the MFP 1 (Step S56). Between the MFP 1 and the server apparatus 2, data transmission and reception is performed using WebSocket, for example, which is a communication protocol supporting other formats besides the text format. The Web browser 19 of the MFP 1 receives the data in the bit format transmitted from the information processing unit 40 of the server apparatus 2 and transmits the data to the card reader 3, for example. The card reader 3 reads the card information from the IC card 6 in accordance with the command as the data in the bit format (Step S57) and transmits the card information to the Web browser 19 (Step S58).

The Web browser 19 executes one control command and then reports the card information (an execution result) read from the IC card to the server apparatus 2. With this, the process returns to Step S51, in which the above-described bit conversion and the like are performed on the next control command within the script. In other words, until the execution of all the control commands within the script is completed, the processing from Step S51 to Step S58 is repeatedly executed. When it is determined that the execution of all the control commands within the script is completed at Step S52, the processing of the flowchart in FIG. 18 ends.

Effects of First Embodiment

As is clear from the foregoing description, the image forming system of the first embodiment includes, on the network such as the Internet, the server apparatus 2 as a common apparatus (a mediating apparatus) of the entire image forming system. The server apparatus 2 reports the tag information to the Web application 39 determined by the tag information stored in the IC card 6. The web application 39 generates a script for performing predetermined processing, such as reading of the card information from the IC card 6 or printing.

The image forming system of the first embodiment can cause the server apparatus 2 as the common apparatus to function as a driver that reads the card information of the IC card 6 through the card reader 3 of the MFP 1. Given this situation, the server apparatus 2 as the common apparatus can directly perform control to read the IC card 6 of the MFP 1. Consequently, processing to install and processing to set up a driver for the IC card 6 for the MFP 1 can be eliminated. Consequently, when the service of the image forming system of the first embodiment is provided using many MFPs 1, the installation and the set-up of the driver for the respective MFPs 1 can be eliminated, which can easily construct the image forming system.

The respective IC cards 6 are associated with the Web applications 39 to be operated, and even when requests for reading to the IC card 6 occur simultaneously from a plurality of Web applications 39, for example, control to read the card information required by each of the Web applications 39 can be accurately performed.

The Web browser 19 only needs to execute the script generated by the server apparatus 2, and a special configuration can be eliminated in the Web browser 19. Consequently, a general Web browser can be used as it is for the Web browser 19. Consequently, the image forming system of the first embodiment can be manufactured at a lower price.

Second Embodiment

The following describes an image forming system of a second embodiment. The first embodiment describes the operation until the execution of one script is completed. In contrast, the second embodiment is an example in which after the completion of the execution of one script, the next script is generated and executed. The first embodiment and the second embodiment are different from each other only in this point. Given this situation, the following describes only the difference between the first and the second embodiments and omits a duplicate description.

Operation of Second Embodiment

Figure 19:
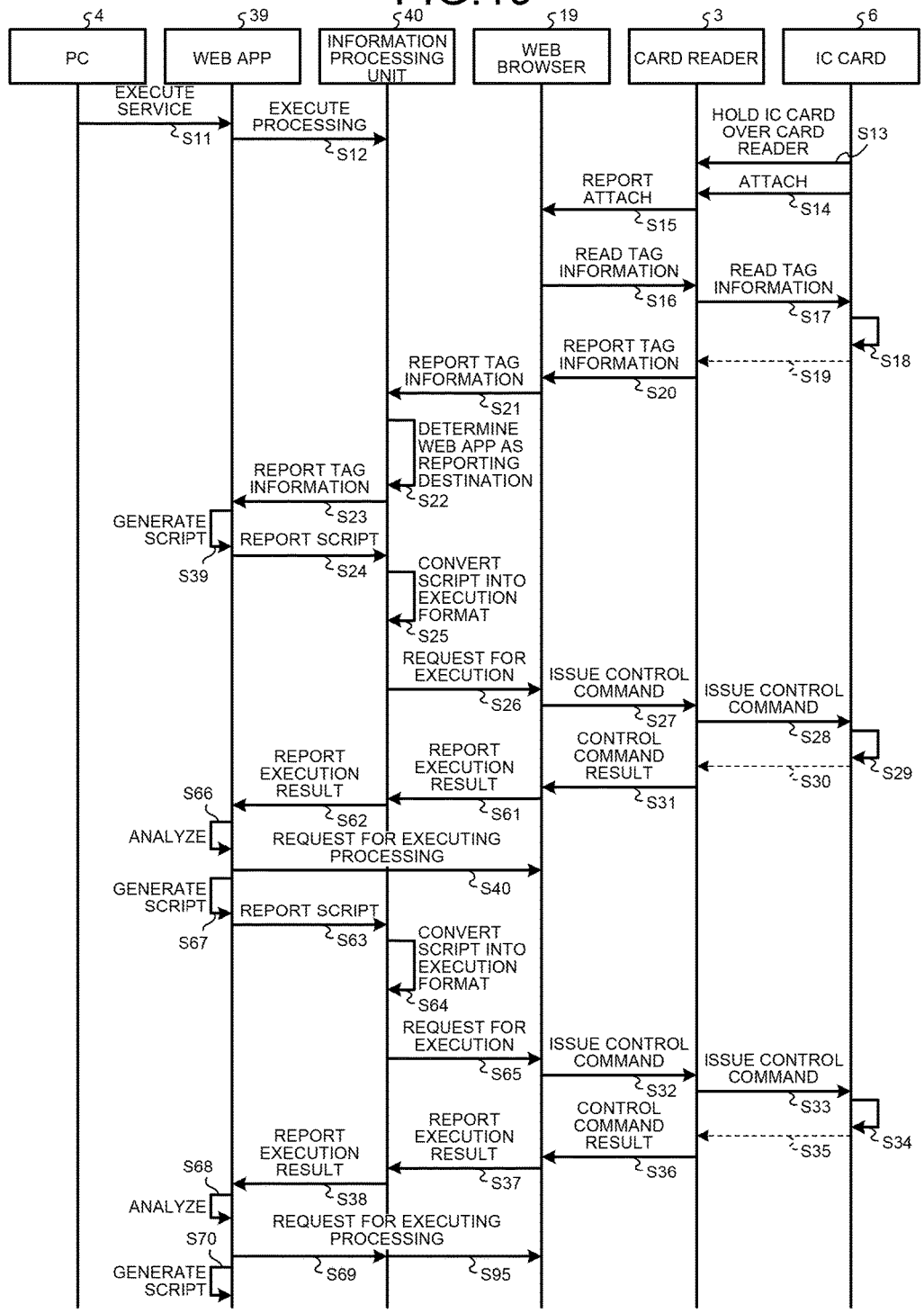
FIG. 19 is a sequence diagram of an operational procedure of an image forming system of a second embodiment.

FIG. 19 is a sequence diagram of an operational procedure of the image forming system of the second embodiment. Step S11 to Step S31 and Step S39 to Step S40 illustrated in this FIG. 19 are the same processing as the processing at Step S11 to Step S31 and Step S39 to Step S40 illustrated in FIG. 12. Refer to the descriptions of the corresponding steps in FIG. 12 for details.

In the sequence diagram in FIG. 19, the card controller 51 and the communication controller 53 of the Web browser 19 of the MFP 1 receive a control command result (card information) corresponding to the first script (Step S39 and Step S24 to Step S26) and then report the control command result (the card information) to the Web application 39 through the information processing unit 40 of the server apparatus 2 (Step S61 to Step S62).

When the Web application 39 receives the control command result (the card information) corresponding to the first script, the analyzing unit 64 (an example of an analyzing unit) analyzes the execution result of the first script (Step S66). Based on the card information received from the card reader 3, the executing unit 63 of the Web application 39 transmits a request for executing the printing designated by the user to the MFP 1 (Step S40). The communication controller 75 of the information processing unit 40 transmits the request for executing the printing received from the web application 39 to the MFP 1, and performs control to execute the printing in the MFP 1 (Step S95). In accordance with the request for executing the printing corresponding to the card information, for example, that is received from the Web application 39 through the Web browser 19, the CPU 11 of the MFP 1 illustrated in FIG. 2 controls the engine unit 17 so as to execute the printing.

The script generating unit 61 of the Web application 39 generates the next, new script based on the analysis result (Step S67). The communicating unit 62 of the Web application 39 reports the generated script to the information processing unit 40 (Step S63). The information processing unit 40 converts the reported new script into the execution format as described above (Step S64) and makes a request for executing the new script to the MFP 1 (Step S65).

The script executing unit 54 of the Web browser 19 of the MFP 1 supplies (issues) the control command corresponding to the script for which the request for execution has been made to the card reader 3 (Step S32). The card reader 3 reads the card information (the control command result) such as the user name and the department to which the user belongs stored in the folder for the corresponding Web app from the IC card 6 in accordance with the control command and the card reader 3 reports the card information to the Web browser 19 (Step S33 to Step S36). The Web browser 19 reports the card information received from the card reader 3 to the Web application 39 through the information processing unit 40 of the server apparatus 2 (report execution result: Step S37 to Step S38).

The Web application 39 receives the control command result corresponding to the script, and the analyzing unit 64 then analyzes the execution result of the script (Step S68). The executing unit 63 of the Web application 39 transmits the request for executing the printing and the like designated by the user to the information processing unit 40 in accordance with the analysis result (Step S69). The communication controller 75 of the information processing unit 40 transmits the request for executing the printing receive from the web application 39 to the MFP 1 and performs control to execute the printing in the MFP 1 (Step S95). In accordance with the request for executing the printing that is received from the web application 39 through the web browser 19 and corresponds to the card information, for example, the CPU 11 of the MFP 1 illustrated in FIG. 2 controls the engine unit 17 to executed the printing.

The script generating unit 61 of the Web application 39 generates the next, new script based on the analysis result (Step S70). Similarly to the above, the generated script is converted into the execution format, is reported to the MFP 1, and is used to read the information of the IC card 6.

Effects of Second Embodiment

As is clear from the foregoing description, the image forming system of the second embodiment executes the script for which the request for execution has been made from the Web application 39 and the image forming system reports its execution result to the Web application 39. The Web application 39 analyzes the execution result and generates the new script. The Web browser 19 of the MFP 1 executes the newly generated script to perform control to read the IC card 6 through the card reader 3. With this, a plurality of scripts corresponding to situations can be executed such as performing control to select a file to be read out of the first file and the second file for Web App B as in Web App B illustrated in FIG. 9, for example, based on the folder information read from the IC card 6. In addition, the same effects as those of the first embodiment can be obtained.

Third Embodiment

The following describes an image forming system of a third embodiment. The image forming system of the third embodiment is an example that enables a folder and a file that require user authentication information to be accessed as in the folder and the file for Web App C illustrated in FIG. 9. The image forming system of the third embodiment has a configuration and operation similar to those of the embodiments other than this point. For this reason, the following describes only the difference and omits a duplicate description.

Operation of Third Embodiment

Figure 20:
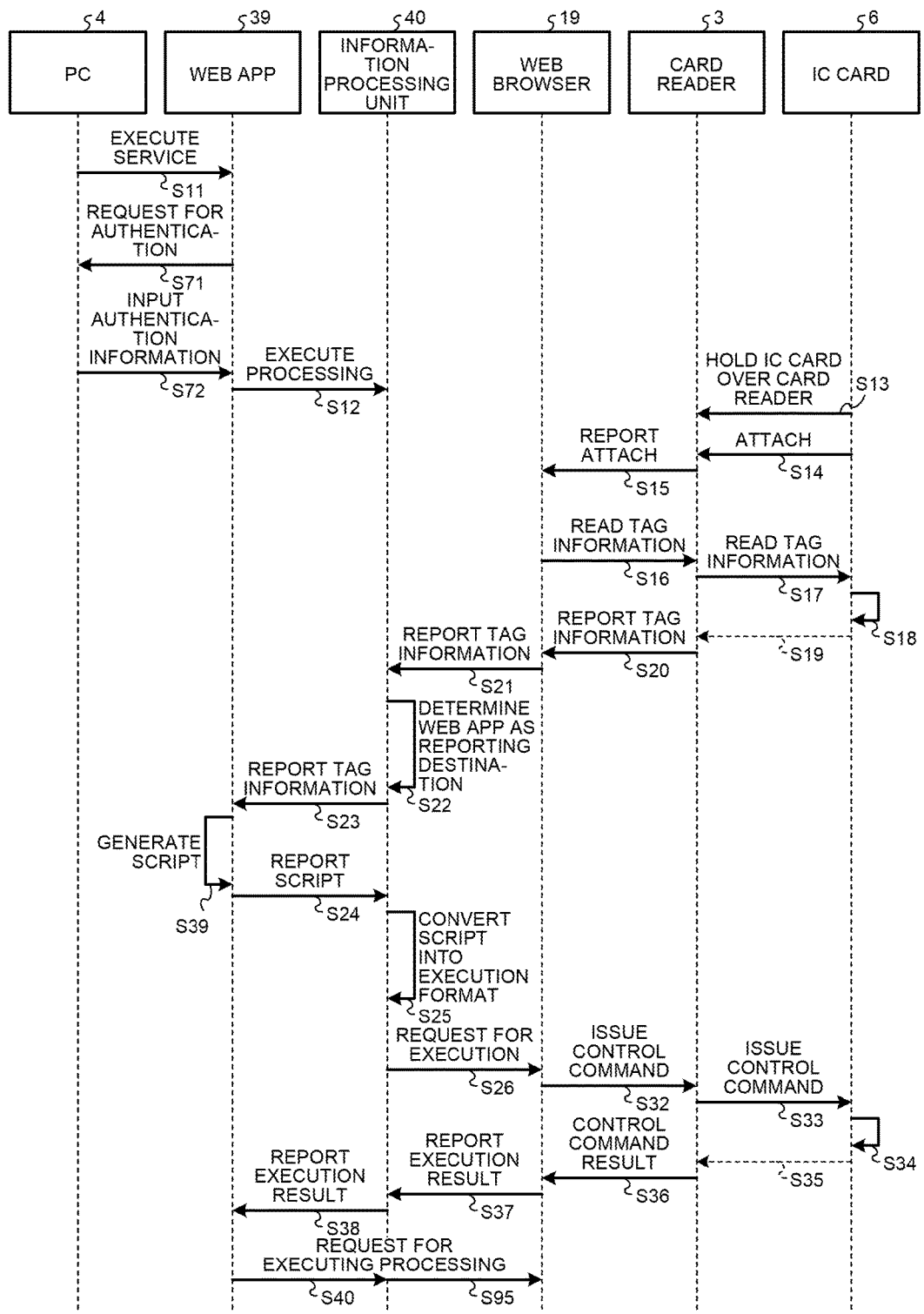
FIG. 20 is a sequence diagram of an operational procedure of an image forming system of a third embodiment.

FIG. 20 is a sequence diagram of an operational procedure of the image forming system of the third embodiment. Step S11 to Step S38 and Step S39 to Step S40 illustrated in this FIG. 20 are the same processing as the processing at Step S11 to Step S38 and Step S39 to Step S40 illustrated in FIG. 12. Refer to the descriptions of the corresponding steps in FIG. 12 for details.

The image forming system of the third embodiment has pieces of processing at Step S71 and Step S72 in between Step S11 and Step S12 in FIG. 20. In other words, when the execution of processing is requested from the user through the PC 4 (Step S11), if the Web application 39 recognizes that authentication information is required to be input to the IC card 6, the Web application 39 makes a request for inputting the authentication information to the PC 4 in advance (Step S71).

The PC 4 displays an input screen for the authentication information on the monitor device, for example. The user operates an operating unit such as a keyboard to operate to input authentication information for accessing the folder and the file for Web App C, for example. The input authentication information is reported to the Web application 39 of the server apparatus 2 (Step S72).

Effects of Third Embodiment

When generating the script at Step S24, the script generating unit 61 of the Web application 39 generates the script including the authentication information. With this, after performing the authentication processing required when accessing the IC card 6, the file and the like can be read. In addition, effects similar to those of the embodiments can be obtained.

Fourth Embodiment

The following describes an image forming system of a fourth embodiment. The third embodiment is an example in which when it is recognized that the authentication information will be required for access as in the folder and the file for Web App C, the user inputs the authentication information through the PC 4 in advance, and the Web application 39 generates the script including the input authentication information to access the IC card 6.

In contrast, the image forming system of the fourth embodiment suspends the script in execution when it is not recognized that the authentication information will be required for accessing the folder and the like of the IC card 6, when a request for inputting the authentication information is made from the IC card 6. The image forming system of the fourth embodiment displays an input screen for the authentication information on the PC 4 of the user and resumes and, when the user has been authenticated to be a legitimate user (when a legitimate authentication result has been obtained) by the authentication information input by the user, resumes the suspended script processing. The image forming system of the fourth embodiment has a configuration and operation similar to those of the third embodiment other than this point. For this reason, the following describes only the difference and omits a duplicate description.

Operation of Fourth Embodiment

Figure 21:
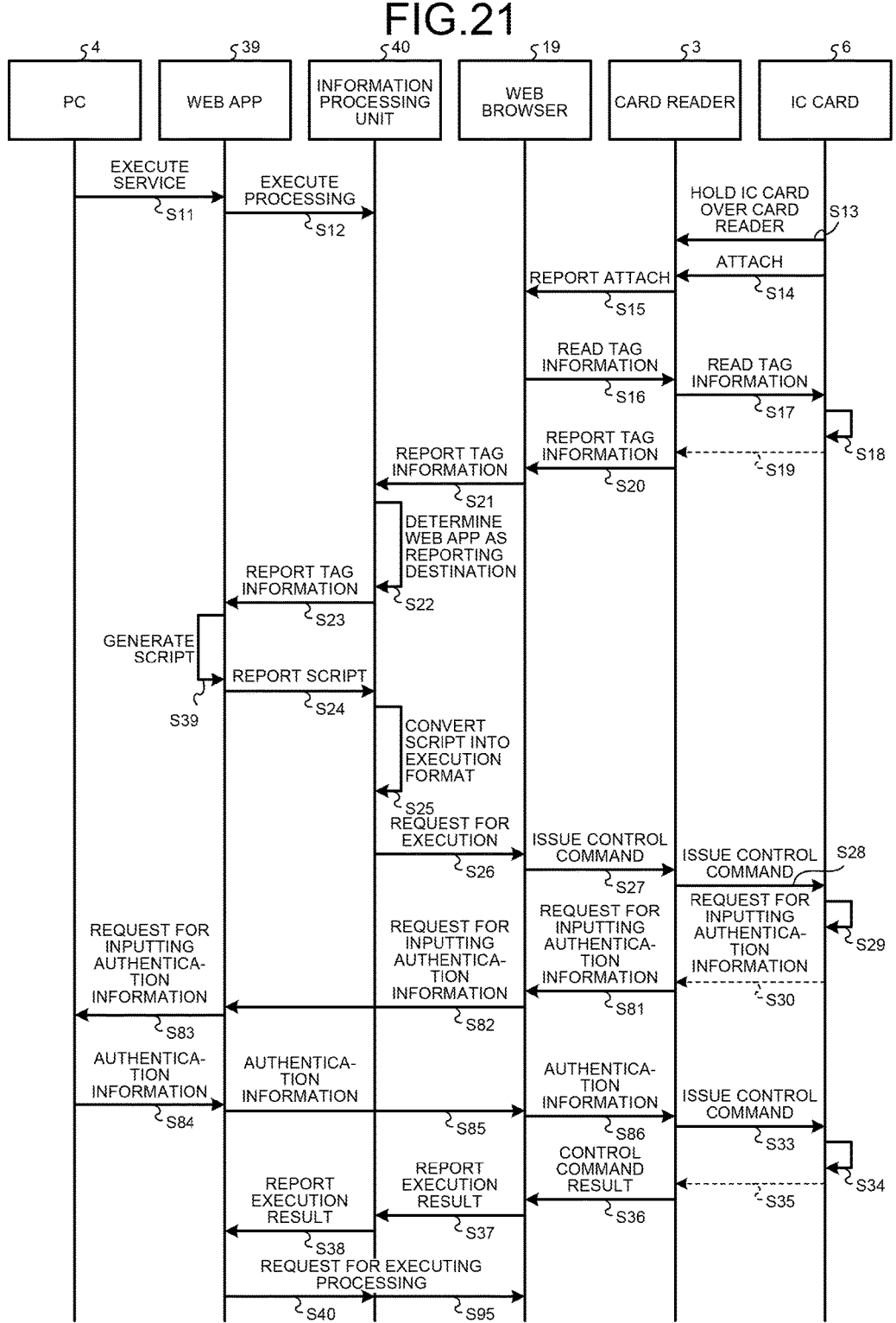
FIG. 21 is a sequence diagram of an operational procedure of an image forming system of a fourth embodiment.

FIG. 21 is a sequence diagram of an operational procedure of the image forming system of the fourth embodiment. Step S11 to Step S30 and Step S33 to Step S40 illustrated in this FIG. 21 are the same processing as the processing at Step S11 to Step S30 and Step S33 to Step S40 illustrated in FIG. 12. Refer to the descriptions of the corresponding steps in FIG. 12 for details.

The image forming system of the fourth embodiment has pieces of processing at Step S81 to Step S86 in between Step S30 and Step S33 in FIG. 21. In other words, when a folder or the like that requires authentication information such as the folder and the file for Web App C in FIG. 9 is accessed based on the script generated by the Web application 39, a request for inputting the authentication information is transmitted from the IC card 6 to the card reader 3 (Step S30). The card reader 3 reports the request for inputting the authentication information to the Web browser 19 of the MFP 1 (Step S81).

Upon reception of the request for inputting the authentication information, the card reader 3 once stops the reading of the card information to the IC card 6. The communication controller 53 of the Web browser 19 transfers the request for inputting the authentication information to the Web app 39 in execution of the server apparatus 2 (Step S82). The Web app 39 transmits the request for inputting the authentication information to the PC 4 of the user (Step S83).

Figure 22:
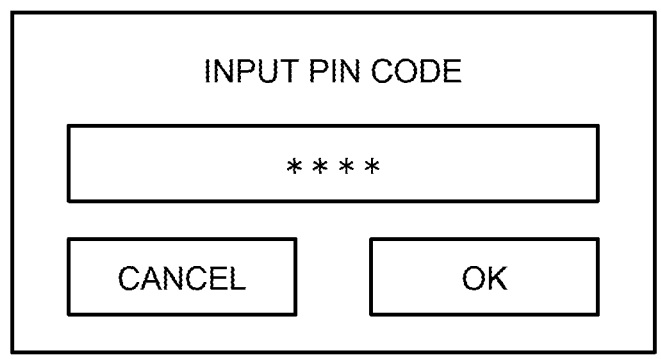
FIG. 22 is a diagram of an example of an input screen for authentication information (a PIN code)

Upon reception of the request for inputting the authentication information, the PC 4 of the user displays an input screen for the authentication information (a PIN code) as illustrated in FIG. 22, for example, on a display unit such as the monitor device. The user operates to input the authentication information to the input screen through the operating unit of the PC 4. The PC 4 transmits the authentication information input by the user to the server apparatus 2 (Step S84). The Web app 39 of the server apparatus 2 receives the authentication information transmitted from the PC 4 by the communicating unit 62 and transmits the authentication information to the Web browser 19 of the MFP 1 (Step S85).

The card controller 51 of the Web browser 19 of the MFP 1 reports the authentication information input by the user to the card reader 3 (Step S86). The card reader 3 issues a control command including the authentication information (a control command with the authentication information added) and resumes the access to the IC card 6. With this, when the authentication information added to the control command is authentication information indicating that the user is a legitimate user, the card information that requires the authentication information within the IC card 6 can be accessed. When the authentication information added to the control command is not the authentication information of the legitimate user, access to the card information is rejected by the IC card 6, thereby disabling the card information to be read.

Effects of Fourth Embodiment

The image forming system of the fourth embodiment receives input of the authentication information in accordance with a request to eliminate the operation to input the authentication information in advance and enables the card information that requires the authentication information of the IC card 6 such as the folder and the file for Web App C in FIG. 9 to be accessed. In addition, the same effects as those of the embodiments can be obtained.

Fifth Embodiment

The following describes an image forming system of a fifth embodiment. In the third embodiment and the fourth embodiment, the authentication information input by the user through the PC 4 is transmitted from the PC 4 to the server apparatus 2 through the network 5 and is further transmitted from the server apparatus 2 to the MFP 1 through the network 5. Given this situation, the authentication information may leak to the network 5. This is not favorable in view of the security of the image forming system.

The image forming system of the fifth embodiment directly acquires the authentication information by the MFP 1 to prevent the trouble that the authentication information leaks to the network 5. The image forming system of the fifth embodiment has a configuration and operation similar to those of the third embodiment and the fourth embodiment other than this point. For this reason, the following describes only the difference and omits a duplicate description.

Operation of Fifth Embodiment

Figure 23:
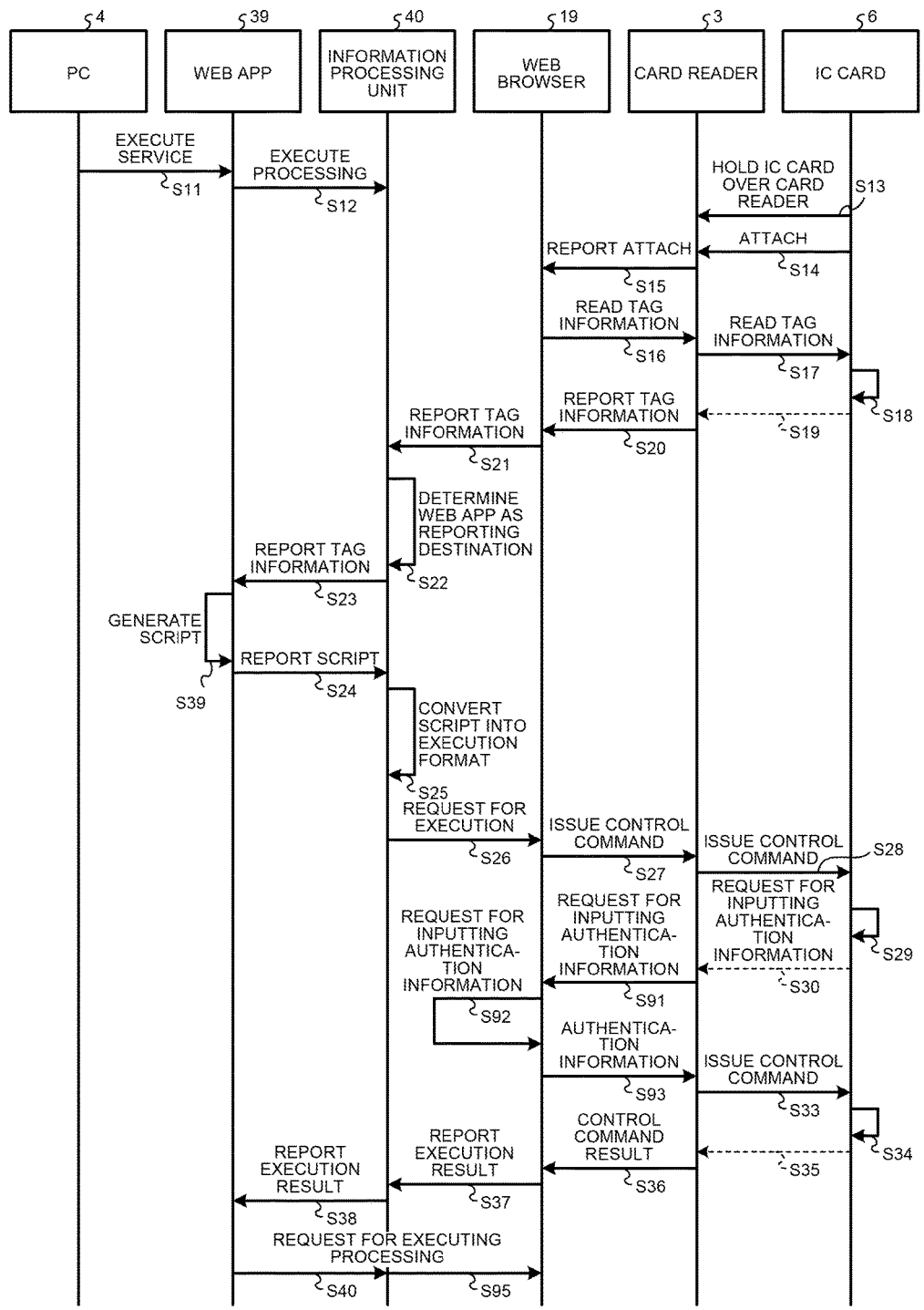
FIG. 23 is a sequence diagram of an operational procedure of an image forming system of a fifth embodiment.

FIG. 23 is a sequence diagram of an operational procedure of the image forming system of the fifth embodiment. Step S11 to Step S30 and Step S33 to Step S40 illustrated in this FIG. 23 are the same processing as the processing at Step S11 to Step S30 and Step S33 to Step S40 illustrated in FIG. 12. Refer to the descriptions of the corresponding steps in FIG. 12 for details.

The image forming system of the fifth embodiment has pieces of processing at Step S91 to Step S93 in between Step S30 and Step S33 in FIG. 23. In other words, when a folder or the like that requires authentication information such as the folder and the file for Web App C in FIG. 9 is accessed based on the script generated by the executing unit 63 of the Web application 39, a request for inputting the authentication information is transmitted from the IC card 6 to the card reader 3 (Step S30). The card reader 3 reports the request for inputting the authentication information to the Web browser 19 of the MFP 1 (Step S91). Upon reception of the request for inputting the authentication information, the card reader 3 once stops the reading of the card information from the IC card 6.

Upon reception of the request for inputting the authentication information by the communication controller 53 as an example of a transmitter and a receiver, the authentication processing unit 56 of the Web browser 19 displays an input screen for the authentication information (a PIN code) as illustrated in FIG. 22, for example, on the operating panel 27 (an example of a display unit) through the display controller 55. The user operates the operating panel 27 to input the authentication information to the input screen (Step S92). Upon input of the authentication information, the card controller 51 of the Web browser 19 reports the authentication information input by the user to the card reader 3 (Step S93). The card reader 3 accesses the IC card 6 using the control command with the authentication information added to resume the reading of the card information. With this, when the authentication information input by the user is authentication information indicating that the user is a legitimate user, the card information of the IC card 6 that requires the authentication information can be accessed. When the authentication information added to the control command is not the authentication information of the legitimate user, access to the card information is rejected by the IC card 6, thereby disabling the card information to be read.

Effects of Fifth Embodiment

The image forming system of the fifth embodiment causes the user to operate the MFP 1 to input the authentication information when the authentication information is required for accessing the card information of the IC card 6 as in the folder and the file for Web App C in FIG. 9, for example. With this, the MFP 1 can directly acquire the authentication information without interposing the network 5. Consequently, the trouble that the authentication information leaks to the network 5 can be prevented, and in addition, the same effects as those of the embodiments can be obtained.

Modifications of Embodiments

The embodiments are presented by way of example and do not intend to limit the scope of the present invention. These novel embodiments can be performed in various other forms, and various kinds of omissions, replacements, and alterations can be made without departing from the essence of the invention.

In the embodiments, the script generated by the server apparatus 2 is executed by the Web browser 19 over the network 5, for example. However, a script generated by the server apparatus 2 may be transmitted to the Web browser 19 through the network 5, and the Web browser 19 may execute the received script.

In this case, the script acquiring unit 72 of the information processing unit 40 acquires the script generated by the script generating unit 61 of the Web application 39. The converting unit 73 of the information processing unit 40 performs conversion on the acquired script into data in the execution format of the Web browser 19. The communication controller 75 of the information processing unit 40 transmits the script subjected to the conversion to the Web browser 19. The Web browser 19 executes the received script and performs control to read the IC card 6 through the card reader 3. With this, effects similar to those of the embodiments can be obtained.

The conversion into the data in the execution format of the Web browser 19 by the converting unit 73 may be performed by the Web browser 19. In this case, the communication controller 75 of the information processing unit 40 transmits the script acquired by the script acquiring unit 72 to the Web browser 19 without performing the conversion into the execution format thereon. The script executing unit 54 (an example of a converter) of the Web browser 19 has the same functions as those of the converting unit 73 and performs conversion on the received script into data in its own execution format to execute it. With this, effects similar to those of the embodiments can be obtained.

The present invention produces an effect of making it possible to eliminate, when a system that provides a service using many devices is constructed, the installation and the set-up of a driver for the respective devices.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A server apparatus comprising:
   at least one memory including computer readable instructions; and
   at least one processor configured to execute the computer readable instructions to,
      when a user issues a request for executing information processing to an information processing apparatus, acquire unique information for uniquely identifying an information storage medium corresponding to the user through a network, the unique information being read from the information storage medium by a reading device,
      determine to which application among a plurality of applications to report the acquired unique information based on the acquired unique information and association information by referring to a memory that stores therein a plurality of pieces of unique information including the acquired unique information, the plurality of applications, and the association information, the plurality of applications relating to information processing in an associated manner with each other, the association information indicating that each piece of unique information included in the pieces of unique information is associated with one of the plurality of applications,
      report the acquired unique information to the determined application,
      acquire, from the determined application as a response to the report, a script that is generated by the determined application based on the unique information, the script being for reading storage information relating to the information processing from the information storage medium, and
      transmit a request for executing the script to the information processing apparatus,
      acquire information read from the information storage medium, using the script generated by the determined application, and
      perform processing based on the acquired information using the determined application.

2. The server apparatus according to claim 1, wherein the at least one processor is further configured to execute the computer readable instructions to
   convert the script to a data format executable by the information processing apparatus, and
   the at least one processor is configured to execute the computer readable instructions to transmit the request for executing the script to the information processing apparatus in the data format executable by the information processing apparatus.

3. The server apparatus according to claim 1, wherein the at least one processor is further configured to execute the computer readable instructions to
   analyze the storage information that is read as the information processing from the information storage medium by executing the script by the information processing apparatus and is transmitted through the network,
   report an analysis result of the storage information to the determined application,
   acquire a new script that is generated by the determined application in accordance with the reported analysis result of the storage information, and
   transmit a request for executing the new script to the information processing apparatus.

4. The server apparatus according to claim 1, wherein the at least one processor is configured to execute the computer readable instructions to acquire the script that is generated by the determined application and includes authentication information requested to be input when the storage information is read from the information storage medium.

5. The server apparatus according to claim 1, wherein the at least one processor is configured to execute the computer readable instructions to
   receive an execution result of the script,
   analyze the execution result of the script,
   generate a new script for executing printing designated by the user based on a result of the analyzing, and
   transmit a request for executing the new script to the information processing apparatus.

6. The server apparatus according to claim 1, wherein the information storage medium is an integrated circuit (IC) card.

7. An information processing system comprising:
   a reading device;
   a server apparatus; and
   an information processing apparatus, wherein
   the reading device, the server apparatus and the information processing apparatus are connected through a network, the reading device is configured to read unique information, the unique information being information uniquely given to each information storage medium for physically identify the information storage medium, the server apparatus includes,
   at least one memory including computer readable instructions, and
   at least one processor configured to execute the computer readable instructions to,
      when a user issues a request for executing information processing to the information processing apparatus, acquire, from the information processing apparatus, unique information for uniquely identifying an information storage medium corresponding to the user through the network, the unique information being read from the information storage medium by a reading device,
      determine to which application among a plurality of applications to report the acquired unique information based on the acquired unique information and association information by referring to the memory that stores therein a plurality of pieces of unique information including the acquired unique information, the plurality of applications, and the association information, the plurality of applications relating to information processing in an associated manner with each other, the association information indicating that each piece of unique information included in the pieces of unique information is associated with one of the plurality of applications,
      report the acquired unique information to the determined application,
      acquire, from the determined application as a response to the report, a script that is generated based on the unique information, the script being for reading storage information relating to the information processing from the information storage medium,
      transmit a request for executing the script to the information processing apparatus,
      acquire information read from the information storage medium, using the acquired script generated by the determined application, and
      perform processing based on the acquired information using the determined application, and
the information processing apparatus is connected to the reading device or is integrated with the reading device and is configured to execute the script.

8. The information processing system according to claim 7, wherein
the information processing apparatus is further configured to execute the computer readable instructions to convert the script into a data format executable by the information processing apparatus, so as to execute the script.

9. The information processing system according to claim 7, wherein the information processing apparatus is further configured to execute the computer readable instructions to,
suspend the execution of the script when a request for inputting authentication information is made from the reading device and, after authentication is performed based on the authentication information input in response to the request for inputting authentication information, and
resume the execution of the suspended script if the authentication succeeds.

10. The information processing system according to claim 7, wherein
the server apparatus is further configured to execute the computer readable instructions to convert the script to a data format executable by the information processing apparatus, and
transmit a request for executing the script to the information processing apparatus in the data format executable by the information processing apparatus.

11. The information processing system according to claim 7, wherein the server apparatus is further configured to execute the computer readable instructions to,
analyze the storage information that is read as the information processing from the information storage medium by executing the script by the information processing apparatus and is transmitted through the network,
report an analysis result of the storage information to the determined application,
acquire a new script that is generated by the determined application in accordance with the reported analysis result of the storage information, and
transmit a request for executing the new script to the information processing apparatus.

12. The information processing system according to claim 7, wherein the server apparatus is further configured to execute the computer readable instructions acquire the script that is generated by the determined application and includes authentication information requested to be input when the storage information is read from the information storage medium.

13. The information processing system according to claim 7, wherein the at least one processor is configured to execute the computer readable instructions to
receive an execution result of the script,
analyze the execution result of the script,
generate a new script for executing printing designated by the user based on a result of the analyzing, and
transmit a request for executing the new script to the information processing apparatus.

14. The information processing system according to claim 7, wherein the information storage medium is an integrated circuit (IC) card.

15. An information processing method comprising:
when a user issues a request for executing information processing to an information processing apparatus, acquiring unique information for uniquely identifying an information storage medium corresponding to the user through a network, the unique information being read from the information storage medium by a reading device;
determining to which application among a plurality of applications to report the acquired unique information based on the acquired unique information and association information by referring to a memory that stores therein a plurality of pieces of unique information including the acquired unique information, the plurality of applications, and the association information, the plurality of applications relating to information processing in an associated manner with each other, the association information indicating that each piece of unique information included in the pieces of unique information is associated with one of the plurality of applications;
reporting the acquired unique information to the determined application;

acquiring, from the determined application as a response to the report, a script that is generated by the determined application based on the unique information, the script being for reading storage information relating to the information processing from the information storage medium;

transmitting a request for executing the acquired script to the information processing apparatus;

acquiring information read from the information storage medium, using the acquired script generated by the determined application; and performing processing based on the acquired information using the determined application.

16. The information processing method according to claim 15, further comprising, converting the script to a data format executable by the information processing apparatus, wherein the requesting includes transmitting a request for executing the script in the data format converted at the converting to the information processing apparatus.

17. The information processing method according to claim 15, further comprising;

analyzing the storage information that is read as the information processing from the information storage medium by executing the script by the information processing apparatus and is transmitted through the network, wherein the reporting includes reporting an analysis result of the storage information to the determined application, the acquiring of the script includes acquiring a new script that is generated by the determined application in accordance with the reported analysis result of the storage information, and the requesting includes transmitting a request for executing the new script to the information processing apparatus.

18. The information processing method according to claim 15, wherein the acquiring of the script includes acquiring the script that is generated by the determined application and includes authentication information requested to be input when the storage information is read from the information storage medium.

19. The information processing method according to claim 15, further comprising:

receiving an execution result of the script;

analyzing the execution result of the script;

generating a new script for executing printing designated by the user based on a result of the analyzing; and transmitting a request for executing the new script to the information processing apparatus.

20. The information processing method according to claim 15, wherein the information storage medium is an integrated circuit (IC) card.

* * * * *